(12) United States Patent
Ding et al.

(10) Patent No.: US 11,882,485 B2
(45) Date of Patent: *Jan. 23, 2024

(54) SESSION MANAGEMENT FUNCTION ENTITY SELECTION METHOD, APPARATUS, AND SYSTEM

(71) Applicant: Huawei Technologies Co., Ltd., Shenzhen (CN)

(72) Inventors: Hui Ding, Shenzhen (CN); Xiaoyan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 892 days.

This patent is subject to a terminal disclaimer.

(21) Appl. No.: 16/874,326

(22) Filed: May 14, 2020

(65) Prior Publication Data

US 2020/0275321 A1 Aug. 27, 2020

Related U.S. Application Data

(63) Continuation of application No. 16/192,713, filed on Nov. 15, 2018, now Pat. No. 10,743,218, which is a
(Continued)

(30) Foreign Application Priority Data

Feb. 21, 2017 (CN) .......................... 201710092451.6
Mar. 7, 2017 (CN) ......................... 201710132027.X

(51) Int. Cl.
*H04W 36/00* (2009.01)
*H04W 36/38* (2009.01)
(Continued)

(52) U.S. Cl.
CPC ..... *H04W 36/0016* (2013.01); *H04L 41/0893* (2013.01); *H04L 65/40* (2013.01);
(Continued)

(58) Field of Classification Search
CPC ............ H04W 36/0016; H04W 76/11; H04W 36/00837; H04W 8/08; H04W 36/38; H04L 41/0893; H04L 65/40
See application file for complete search history.

(56) References Cited

U.S. PATENT DOCUMENTS

| 9,282,046 B1 | 3/2016 | Dropps et al. | |
| 2003/0053430 A1* | 3/2003 | Choi | ................... H04W 36/125 |
| 2014/0047121 A1 | 2/2014 | Karlsson | |

FOREIGN PATENT DOCUMENTS

CN 105792368 A 7/2016

OTHER PUBLICATIONS

3GPP TR 23.799 V1.1.0 (Oct. 2016), 3rd Generation Partnership Project; Technical Specification Group Services and System Aspects; Study on Architecture for Next Generation System (Release 14), Oct. 2016, 501 pages.
(Continued)

*Primary Examiner* — Ronald B Abelson
(74) *Attorney, Agent, or Firm* — Conley Rose, P.C.

(57) ABSTRACT

A session management function entity selection method includes receiving a reselection indication and information about a first session of user equipment UE from a first session management function entity, where the reselection indication is used to instruct to reselect a session management function entity; saving a correspondence between the first session management function entity and the information about the first session according to the reselection indication; receiving a session establishment request message, where the session establishment request message carries the information about the first session; determining a second session management function entity different from the first session management function entity; and sending a session management request to the second session management function entity.

20 Claims, 10 Drawing Sheets

Related U.S. Application Data continuation of application No. PCT/CN2018/075472, filed on Feb. 6, 2018.

(51) Int. Cl.
*H04W 76/11* (2018.01)
*H04W 8/08* (2009.01)
*H04L 41/08* (2022.01)
*H04L 65/40* (2022.01)
*H04L 41/0893* (2022.01)

(52) U.S. Cl.
CPC ....... *H04W 8/08* (2013.01); *H04W 36/00837* (2018.08); *H04W 36/38* (2013.01); *H04W 76/11* (2018.02)

(56) References Cited

OTHER PUBLICATIONS

Huawei, et al., "An alternative solution and interim agreement on a network-based SSC mode determination," SA WG2 Meeting #S2-118, S2-166714, Nov. 14-18, 2016, Reno, Nevada, 3 pages.

CATT, "Network slicing architecture and slice selection mechanism," SA WG2 Meeting #115, S2-162652, May 23-27, 2016, Nanjing, P.R. China, 3 pages.

3GPP TS 23.502 V0.1.1, "3rd Generation Partnership Project; Technical Specification Group Services and System Aspects; Procedures for the 5G Systems; Stage 2; Release 15," Jan. 2017, 46 pages.

3GPP TS 24.161, V13.3.0, (Dec. 2016), "3rd Generation Partnership Project; Technical Specification Group Core Network and Terminals; Networks-Based IP Flow Mobility (NBIFOM); Stage 3 (Release 13)," Dec. 2016, 49 pages.

XP051216330, S2-170141 Ericsson, "23.501: SMF Selection," SA WG2 Meeting #118BIS, Jan. 16-20, Spokane, WA, USA, 3 pages.

XP051217249, S2-171133 Samsung, "SMF selection in roaming scenario," SA WG2 Meeting #119, Feb. 13-17, 2017, Dubrovnik, Croatia, 2 pages.

S2-171118, ZTE, "TS23.501 SMF selection," SA WG2 Meeting #119, Feb. 13-17, 2017, Dubrovnik, Croatia, 2 pages.

3GPP TS 23.502, V0.1.1, Jan. 2017, "3rd Generation Partnership Project; Technical Specification Group Services and System Aspects; Procedures for the 5G System; Stage 2; (Release 15)," 46 pages.

3GPP TS 24.161, V13.3.0, Dec. 2016, "3rd Generation Partnership Project; Technical Specification Group Core Network and Terminals; Network-Based IP Flow Mobility (NBIFOM); Stage 3 (Release 13)," 49 pages.

S2-171086, Huawei, et al., "TS 23.501: Provisioning of policy from PCF to UE," SA WG2 Meeting #119, Feb. 13-17, 2017, Dubrovnik, HR, 7 pages.

S2-166674, Huawei, "Interim agreement on HO and TAU principles," SA WG2 Meeting #118, Nov. 14-18, 2016, Reno, USA, 7 pages.

* cited by examiner

SESSION MANAGEMENT FUNCTION ENTITY SELECTION METHOD, APPARATUS, AND SYSTEM

CROSS-REFERENCE TO RELATED APPLICATIONS

This is a continuation of U.S. patent application Ser. No. 16/192,713, filed on Nov. 15, 2018, which is a continuation of Int'l Patent App. No. PCT/CN2018/075472, filed on Feb. 6, 2018, which claims priority to Chinese Patent App. No. 201710092451.6, filed on Feb. 21, 2017 and Chinese Patent App. No. 201710132027.X, filed on Mar. 7, 2017, all of which are incorporated by reference.

TECHNICAL FIELD

This application relates to the field of communications technologies, and in particular, to a session management function entity selection method, apparatus, and system.

BACKGROUND

In the 5th Generation (5G) communications system, there are three types of session and service continuity modes (SSC mode), which are separately described below. A first mode is to ensure session continuity when a terminated user plane function (TUPF) remains unchanged. As an anchor of a user plane, the TUPF remains unchanged, to ensure session continuity. The TUPF is a last UPF that the user plane is connected to a data network. The TUPF may be considered as a user plane function entity with an anchoring function. A second mode is to maintain session continuity in a specific area. The TUPF remains unchanged in a specific area, but the TUPF changes when user equipment (UE) used by a user moves out of the area. Therefore, session continuity is ensured in the specific area, but session continuity is not ensured outside the area. A third mode is to ensure session continuity when a TUPF changes. In the third mode, when the TUPF changes, session continuity may be ensured in the following manners. A new TUPF is used for a new session initiated by the UE; and a current TUPF is still used for an existing session of the UE. For ease of description, the first mode, the second mode, and the third mode of the SSC mode are respectively referred to as an SSC mode 1, an SSC mode 2, and an SSC mode 3 below.

In an existing solution, for packet data unit (PDU) sessions in the SSC mode 2 and the SSC mode 3, when a session management function (SMF) entity needs to be selected due to an event such as a UE location change (the selected SMF may be a current SMF or a new SMF), an access and mobility management function (AMF) entity performs an SMF selection operation. However, this manner has the following disadvantages. The AMF does not sense information about PDU session management, and if the AMF continues to perform the SMF selection operation, the selected SMF may be improper.

SUMMARY

Embodiments of the present application provide a session management function entity selection method, apparatus, and system, so as to resolve a problem of selecting an improper session management function entity.

To achieve the foregoing objective, the embodiments of the present application provide the following technical solutions.

According to a first aspect, a session management function entity selection method is provided. The method includes first receiving a reselection indication and information about a first session of user equipment UE from a first session management function entity, where the reselection indication is used to instruct to reselect a session management function entity; next saving a correspondence between the first session management function entity and the information about the first session according to the reselection indication; then receiving a session establishment request message that carries the information about the first session; determining a second session management function entity different from the first session management function entity; and sending a session management request to the second session management function entity. The first session management function entity is a session management function entity that is corresponding to the information about the first session and that is determined by querying the correspondence saved on itself.

Because the first session management function entity can sense information about session management, the first session management function entity determines whether to reselect a session management function entity. If determining to reselect a session management function entity, the first session management function entity sends the reselection indication. Then a party of receiving the reselection indication selects a session management function entity different from the first session management function entity to continue to serve the UE, so that the session management function entity selected in this method is more proper than a session management function entity selected in some approaches. The reselection indication may be used to instruct to reselect a session management function entity for the first session.

In a possible design, the information about the first session includes an identifier of the first session; or the information about the first session includes an identifier of the UE and an identifier of the first session.

In a possible design, in addition to the information about the first session, the session establishment request message carries an identifier of a second session to be created by the UE. In this case, the session identifier assigned by the UE to the to-be-created session is correspondingly different from the identifier of the first session.

In a possible design, before the receiving a session establishment request message, the method further includes sending a session re-establishment indication to the UE, to instruct the UE to establish the second session.

In a possible design, before the receiving a location change notification message, the method further includes establishing the first session, where the first session management function entity is a session management function entity that serves the first session.

According to a second aspect, an embodiment of the present application provides another session management function entity selection method. The method includes first receiving a session management function entity reselection result and information about a first session of user equipment UE from a first session management function entity, where the session management function entity reselection result includes information about a second session management function entity; next saving a correspondence between the second session management function entity and the information about the first session; then receiving a session establishment request message that carries the information about the first session; determining, by querying the correspondence, the second session management function entity corresponding to the information about the first session; and sending a session management request to the second session management function entity.

Because the first session management function entity can sense information about session management, the first session management function entity determines whether to reselect a session management function entity. If determining to reselect a session management function entity, the first session management function entity determines the reselected session management function entity and sends the reselection result. Then a party of receiving the reselection result selects the session management function entity to continue to serve the UE, so that the session management function entity selected in the method is more proper than a session management function entity selected in some approaches. The reselection result may include the second session management function entity reselected for the first session.

According to a third aspect, an embodiment of the present application provides another session management function entity selection method. The method includes first receiving a session management function entity selection result and information about a first session of user equipment UE from a first session management function entity, where the session management function entity selection result includes information about the first session management function entity; or receiving indication information and information about a first session of user equipment UE from a first session management function entity; next saving a correspondence between the first session management function entity and the information about the first session; then receiving a session establishment request message, where the session establishment request message carries the information about the first session; determining, by querying the correspondence, the first session management function entity corresponding to the information about the first session; and sending a session management request to the first session management function entity. Because the first session management function entity can sense information about session management, the first session management function entity determines to reselect a session management function entity, so that the session management function entity selected in this method is more proper than a session management function entity selected in some approaches.

According to a fourth aspect, an embodiment of the present application provides a session management function entity selection apparatus, and the apparatus has a function of performing the method embodiment according to any one of the first aspect to the third aspect. The function may be implemented by using hardware, or may be implemented by hardware executing corresponding software. The hardware or the software includes one or more modules corresponding to the foregoing function.

According to a fifth aspect, an embodiment of the present application provides a session management function entity selection apparatus, including a processor, a memory, a bus, and a communications interface. The memory is configured to store a computer-executable instruction, the processor and the memory are connected by using the bus, and when the apparatus runs, the processor executes the computer-executable instruction stored in the memory, so that the session management function entity selection apparatus performs the session management function entity selection method according to any one of the first aspect to the third aspect.

According to a sixth aspect, an embodiment of the present application provides a session management function entity selection system, including an execution body in the method embodiments or the apparatus embodiments, and further including a first session management function entity. The first session management function entity is configured to determine whether to reselect a session management function entity, and send a reselection indication. Alternatively, the first session management function entity is configured to determine a reselected session management function entity, and send a reselection result.

According to a seventh aspect, an embodiment of the present application provides a computer program product including an instruction. When the computer program product including the instruction runs on a computer, the computer is enabled to perform the methods in the foregoing aspects.

According to an eighth aspect, an embodiment of the present application provides a computer storage medium, including an instruction. When the instruction runs on a computer, the computer is enabled to perform the methods in the foregoing aspects.

These aspects or other aspects of this application are clearer and more comprehensible in descriptions of the following embodiments.

DESCRIPTION OF EMBODIMENTS

Figure 1:
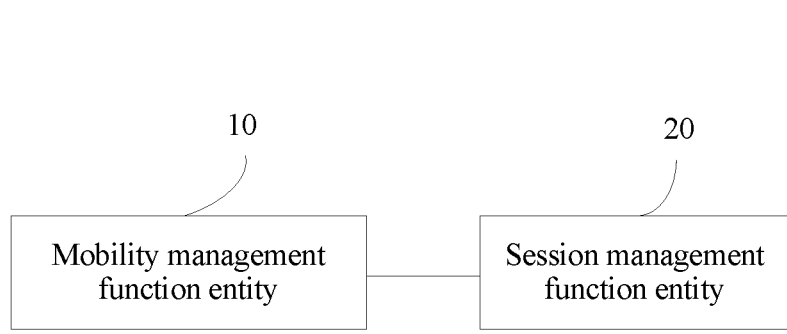
FIG. 1 is a schematic diagram of a possible system network according to an embodiment of the present application.

To make the objectives, technical solutions, and advantages of the present application clearer, the following further describes this application in detail with reference to the accompanying drawings. An operation method in a method embodiment may also be applied to an apparatus embodiment or a system embodiment.

Network architectures and business scenarios described in the embodiments of the present application aim to more clearly describe the technical solutions in the embodiments of the present application, but are not intended to limit the technical solutions provided in the embodiments of the present application. Persons of ordinary skill in the art may know that as the network architectures evolve and a new business scenario emerges, the technical solutions provided in the embodiments of the present application are further applicable to a similar technical problem.

An embodiment of the present application provides a session management function entity selection system 100. The system 100 includes a mobility management function entity 10 and a session management function entity 20.

As an implementation, the mobility management function entity 10 first receives a location change notification message; and then the mobility management function entity 10 sends a session management message to the session management function entity 20. The session management function entity 20 may be used as a first session management function entity. After receiving the session management message, the session management function entity 20 determines whether to reselect a session management function entity. If determining to reselect a session management function entity, the session management function entity 20 sends, to the mobility management function entity 10, a reselection indication and information about a first session of user equipment UE, where the reselection indication is used to instruct to reselect a session management function entity. The mobility management function entity 10 saves a correspondence between the first session management function entity and the information about the first session according to the reselection indication. Then, the mobility management function entity 10 receives a session establishment request message, where the session establishment request message carries the information about the first session; after receiving the session establishment request message, the mobility management function entity 10 determines a session management function entity different from the session management function entity 20, such as a second session management function entity; and then the mobility management function entity 10 sends a session management request to the second session management function entity.

In the session management function entity selection method provided above, because the session management function entity 20 can sense information about session management, the session management function entity 20 determines whether to reselect a session management function entity. If determining to reselect a session management function entity, the session management function entity 20 sends the reselection indication to the mobility management function entity 10. The mobility management function entity 10 selects a session management function entity different from the session management function entity 20 to continue to serve the UE, so that the session management function entity selected in this method is more proper than a session management function entity selected by a mobility management function entity in some approaches.

The reselection indication may be used to instruct to reselect a session management function entity for the first session.

As another implementation, the mobility management function entity 10 first receives a location change notification message; and then the mobility management function entity 10 sends a session management message to the session management function entity 20. The session management function entity 20 may be used as a first session management function entity. After receiving the session management message, the session management function entity 20 determines whether to reselect a session management function entity. If determining to reselect a session management function entity, the session management function entity 20 determines the reselected session management function entity, for example, a third session management function entity. After determining the third session management function entity, the session management function entity 20 sends, to the mobility management function entity 10, a session management function entity reselection result and information about a first session of user equipment UE, where the session management function entity reselection result includes information about the determined third session management function entity. After receiving the session management function entity reselection result, the mobility management function entity 10 saves a correspondence between the third session management function entity and the information about the first session. Then, the mobility management function entity 10 receives a session establishment request message, where the session establishment request message carries the information about the first session; after receiving the session establishment request message, the mobility management function entity 10 determines, by querying the saved correspondence, a session management function entity corresponding to the information about the first session, namely, the third session management function entity; and then the mobility management function entity 10 sends a session management request to the third session management function entity. The information about the determined third session management function entity may be an identifier of the third session management function entity, or an address of the third session management function entity, or other information that may represent the third session management function entity. This is not limited in this application.

In the session management function entity selection method provided above, because the session management function entity 20 can sense information about session management, the session management function entity 20 determines whether to reselect a session management function entity. If determining to reselect a session management function entity, the session management function entity 20 determines the reselected third session management function entity and sends the reselection result. Then a party of receiving the reselection result selects the session management function entity to continue to serve the UE, so that the session management function entity selected in the method is more proper than a session management function entity selected in some approaches.

The reselection result may include the third session management function entity reselected for the first session.

As another implementation, the mobility management function entity 10 first receives a location change notification message; and then the mobility management function entity 10 sends a session management message to the session management function entity 20. The session management function entity 20 may be used as a first session management function entity. After receiving the session management message, the session management function entity 20 determines to reselect a UPF. In this case, the session management function entity 20 sends, to the mobility management function entity 10, a session management function entity selection result and information about a first session of user equipment UE. The session management function entity selection result includes information about the first session management function entity. Alternatively, after receiving the session management message, the session management function entity 20 determines to reselect a UPF. In this case, the session management function entity 20 sends, to the mobility management function entity 10, indication information and information about a first session of user equipment UE. After receiving the foregoing information sent by the session management function entity 20, the mobility management function entity 10 saves a correspondence between the first session management function entity and the information about the first session. Then, the mobility management function entity 10 receives a session establishment request message, where the session establishment request message carries the information about the first session; after receiving the session establishment request message, the mobility management function entity 10 determines, by querying the saved correspondence, a session management function entity corresponding to the information about the first session, namely, the first session management function entity; and then the mobility management function entity 10 sends a session management request to the first session management function entity. The information about the first session management function entity may be an identifier of the first session management function entity, or an address of the first session management function entity, or other information that may represent the first session management function entity. This is not limited in this application.

The indication information may be a session re-establishment indication, or a UPF reselection indication, or indication information that an SMF does not need to be reselected, or a session release timer, or another implicit indication message. This is not limited in this application.

In addition, the session management function entity 20 determines, in a plurality of methods, to reselect a UPF, for example, first determines whether a source UPF can continue to provide a service for the UE. If the source UPF cannot provide a service for the UE, another UPF managed by the session management function entity 20 may provide a service for the UE. Certainly, the session management function entity 20 may determine, in another method, to reselect a UPF. There are a plurality of reasons why the source UPF cannot continue to provide a service for the UE. The source UPF may be overloaded, or the source UPF cannot continue to provide a service for the UE because of a change of a UE location, or the like.

In the session management function entity selection method provided above, because the session management function entity 20 can sense information about session management, the session management function entity 20 determines a session management function entity, so that the session management function entity selected in this method is more proper than a session management function entity selected by a mobility management function entity in some approaches.

The user equipment UE in this application may include various handheld devices having a wireless communication function, in-vehicle devices, wearable devices, computing devices, or another processing device connected to a wireless modem, and user equipment UE, a mobile station (MS), a terminal, terminal equipment, a soft terminal, and the like that are in various forms. For ease of description, in this application, the above-mentioned devices are collectively referred to as user equipment or UE.

In FIG. 1, a mobility management function entity 10 and a session management function entity 20 are merely a name, and the name does not constitute a limitation on the entity. For example, the "mobility management function entity" may be replaced with an "access and mobility management function entity" or another name; and the session management function entity 20 may be replaced with a "session management function" or another name. In addition, the mobility management function entity 10 may be corresponding to an entity that includes another function in addition to a mobility management function. The session management function entity 20 may be corresponding to an entity that includes another function in addition to a session management function. A description is provided herein, and details are not described below again.

In an implementation, the location change notification message may be a handover notification message, or a location area update request message, or a message in another name. This is not limited herein. The session management message may be a UE mobility event notification message, or a handover notification message, or a non-access stratum (NAS) notification message (NAS Message Notify), or a message in another name. This is not limited herein. The session management request may be a session establishment request or a message in another name. This is not limited herein.

In an implementation, the information about the first session may include an identifier of the first session, or may include an identifier of UE and an identifier of the first session, or certainly may include other content.

In an implementation, the first session has been established before the mobility management function entity 10 receives the location change notification message. The first session management function entity is a session management function entity that serves the first session.

In an implementation, the session management function entity 20 determines, in a plurality of methods, whether to reselect a session management function entity. In a first method, the session management function entity 20 determines that the session management function entity 20 is overloaded, and cannot continue to provide a service for the UE. In a second method, the session management function entity 20 determines that a source user plane function (UPF) entity that currently provides a service for a PDU session cannot continue to provide a service for the UE, and a target UPF that can provide a service for the UE is managed by another session management function entity, for example, the UE is not within a service range of the session management function entity 20. There are a plurality of reasons why the source UPF cannot continue to provide a service for the UE. The source UPF may be overloaded, or the source UPF cannot continue to provide a service for the UE because of a change of a UE location. Certainly, the session management function entity 20 may determine, in another method, whether to reselect a session management function entity. If the mobility management function entity 10 sends the session management message to the session management function entity 20 at a granularity of an SMF described in the following embodiment, the session management function entity 20 may first determine, based on the identifier of the UE, a PDU session in which the session management function entity 20 provides a service for the UE, and then determine whether to reselect an SMF for the PDU session.

In an implementation, the mobility management function entity 10 determines a session management function entity different from the session management function entity 20 in a plurality of methods, and may use any one of the following methods or another method.

In a first method, the mobility management function entity 10 queries a topology management function entity based on a UE location or a UE location and data network information, to obtain a session management function entity that is different from the session management function entity 20 and that may provide a service for the UE. The data network information may be access point name (APN) information or data network name (DNN) information. The topology management function entity may be independently disposed in actual deployment, or may be integrated with an existing network element in a network, for example, integrated with a domain name server (DNS), the mobility management function entity 10, or a network element registration and discovery function entity, for example, a network repository function (NRF) entity or a network function repository function entity.

For example, the topology management function entity may obtain a list of other UPFs that may currently provide services for the UE, obtain (for example, through querying the DNS) information about a session management function entity corresponding to each UPF in the UPF list, and select a corresponding session management function entity different from the session management function entity 20. The information about a session management function entity includes an identifier of the session management function entity and/or load of the session management function entity.

In a second method, the mobility management function entity 10 selects a session management function entity that is different from the session management function entity 20 and that is configured in user subscription data.

In a third method, if the UE already has a PDU session with same data network information, the mobility management function entity 10 selects a session management function entity that is different from the session management function entity 20 and that is corresponding to the PDU session.

In a fourth method, the mobility management function entity 10 constructs a session management function entity host name based on the identifier of the UE and network configuration information, to obtain (for example, through querying a DNS) a session management function entity that is different from the session management function entity 20 and that is corresponding to the host name.

In an implementation, a method for determining a reselected third session management function entity by the session management function entity 20 may be as follows. The session management function entity 20 may determine the third session management function entity in the first method, for example, query the topology management function entity based on the UE location or the UE location and the data network information, to obtain the session management function entity that is different from the session management function entity 20 and that may provide a service for the UE. The session management function entity 20 may use another method in some approaches.

In an implementation, the UE location (or target access area information) may be a target base station identifier, or a target cell identifier, or a target tracking area identifier, or other information that may indicate a location to which the UE is to be handed over. This is not limited herein.

Figure 2:
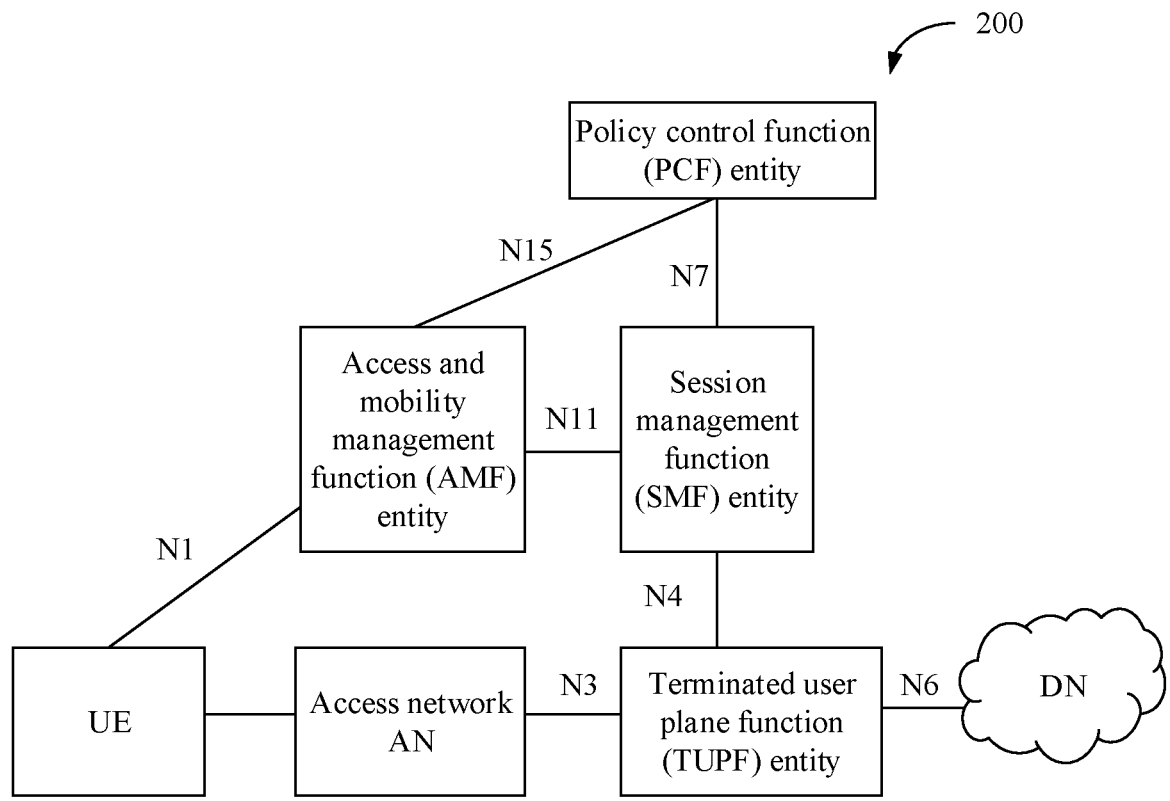
FIG. 2 is a schematic diagram of another possible system network according to an embodiment of the present application.

FIG. 2 shows an example of a 5G system 200 according to this application. Certainly, this application is not limited to the system. The session management function entity selection method provided in this embodiment of the present application may be applied to the systems shown in FIG. 1 and FIG. 2.

The system 200 shown in FIG. 2 includes an AMF and an SMF. The AMF is an example of the mobility management function entity 10 in FIG. 1, and the SMF is an example of the session management function entity 20 in FIG. 1. The AMF is an access and mobility management function entity, performs UE access and mobility management, receives a UE mobility policy and a network selection policy that are provided by a policy control function (PCF) entity, and executes the policies. The SMF is a session management function entity, performs session management, receives a session or service flow control policy provided by the PCF, and executes the policy, and may further have a function of selecting a TUPF, assigning an Internet Protocol (IP) address to UE, or the like.

The system 200 may further include a PCF, a TUPF, or an access network (AN). The PCF is a policy control function entity, and is mainly responsible for performing policy control such as charging, quality of service (QoS) and mobility on a session level or a service flow level. As a user plane function interfaced with a data network, the TUPF implements functions such as user plane data forwarding, charging statistics based on a session level or a service flow level, and bandwidth throttling. The AN is an access network in 5G and performs a function such as allocation and scheduling of a bearer resource. There may also be another user plane function entity between the AN and the TUPF.

In the system 200, in the session management function entity selection method provided in this application, because the SMF can sense information about session management, for example, an SMF service range, SMF load, UPF load, or an SSC mode, the SMF determines whether to reselect an SMF, or the SMF determines a reselected SMF, so that the SMF selected in this method is more proper than an SMF selected by an AMF in some approaches.

In an implementation, any function node or network element in the system 100 or the system 200 may be implemented by one entity device, or may be jointly implemented by a plurality of entity devices. This is not specifically limited in this embodiment of the present application. For example, it may be understood that the any function node or network element in the system 100 or the system 200 may be a logical function module in an entity device or a logical function module including a plurality of entity devices. This is not specifically limited in this embodiment of the present application.

Figure 3:
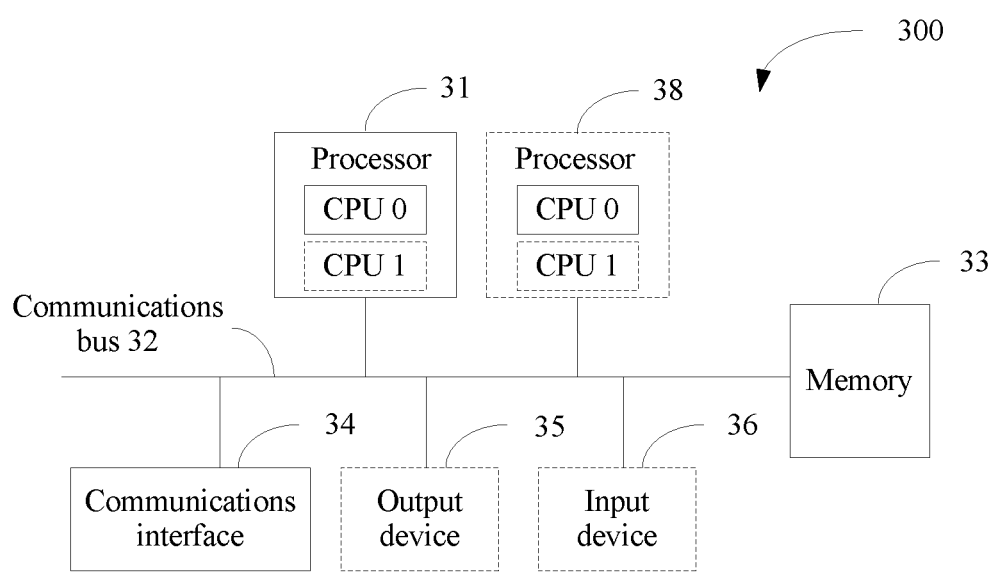
FIG. 3 is a schematic diagram of a computer device according to an embodiment of the present application.

As shown in FIG. 3, the mobility management function entity 10 in FIG. 1 or the AMF in FIG. 2 may be implemented by using a computer device (or a system) in FIG. 3.

FIG. 3 is a schematic diagram of a computer device according to an embodiment of the present application. A computer device 300 includes at least one processor 31, a communications bus 32, a memory 33, and at least one communications interface 34.

The processor 31 may be a general-purpose central processing unit (CPU), a microprocessor, an application-specific integrated circuit (ASIC), or one or more integrated circuits configured to control program execution in the solution of the present application.

The communications bus 32 may include a channel that transmits information between the foregoing components. The communications interface 34 uses an apparatus such as any transceiver, and is configured to communicate with another device or a communications network, for example, Ethernet, a radio access network (RAN), or a wireless local area network (WLAN).

The memory 33 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, the memory 33 is not limited herein. The memory may exist independently, and is connected to the processor by using the bus. Alternatively, the memory may be integrated with the processor.

The memory 33 is configured to store application program code used to execute the solution of the present application, and the application program code is controlled and executed by the processor 31. The processor 31 is configured to execute the application program code stored in the memory 33.

In an embodiment, the processor 31 may include one or more CPUs, for example, a CPU 0 and a CPU 1 in FIG. 3.

In an embodiment, the computer device 300 may include a plurality of processors, for example, the processor 31 and a processor 38 in FIG. 3. Each of these processors may be a single-core (single-CPU) processor or a multi-core (multi-CPU) processor. The processor herein may be one or more devices, circuits, and/or processing cores configured to process data (for example, a computer program instruction).

In an embodiment, the computer device 300 may further include an output device 35 and an input device 36. The output device 35 communicates with the processor 31, and may display information in a plurality of manners. For example, the output device 35 may be a liquid crystal display (LCD), a light emitting diode (LED) display device, a cathode-ray tube (CRT) display device, or a projector. The input device 36 communicates with the processor 31, and may receive input of a user in a plurality of manners. For example, the input device 36 may be a mouse, a keyboard, a touchscreen device, or a sensing device.

The computer device 300 may be a general-purpose computer device or a dedicated computer device. In an implementation, the computer device 300 may be a desktop computer, a portable computer, a network server, a personal digital assistant (PDA), a mobile phone, a tablet computer, a wireless terminal device, a communications device, an embedded device, or a device having a structure similar to that in FIG. 3. A type of the computer device 300 is not limited in this embodiment of the present application.

For example, the mobility management function entity 10 in FIG. 1 or the AMF in FIG. 2 may be the device shown in FIG. 3, and one or more software modules are stored in a memory of the mobility management function entity 10 or the AMF. The mobility management function entity 10 or the AMF may implement the software modules by using a processor and program code in a memory, to select a session management function entity.

The following describes, with reference to a flowchart, the session management function entity selection method provided in the embodiments of the present application.

Figure 4:
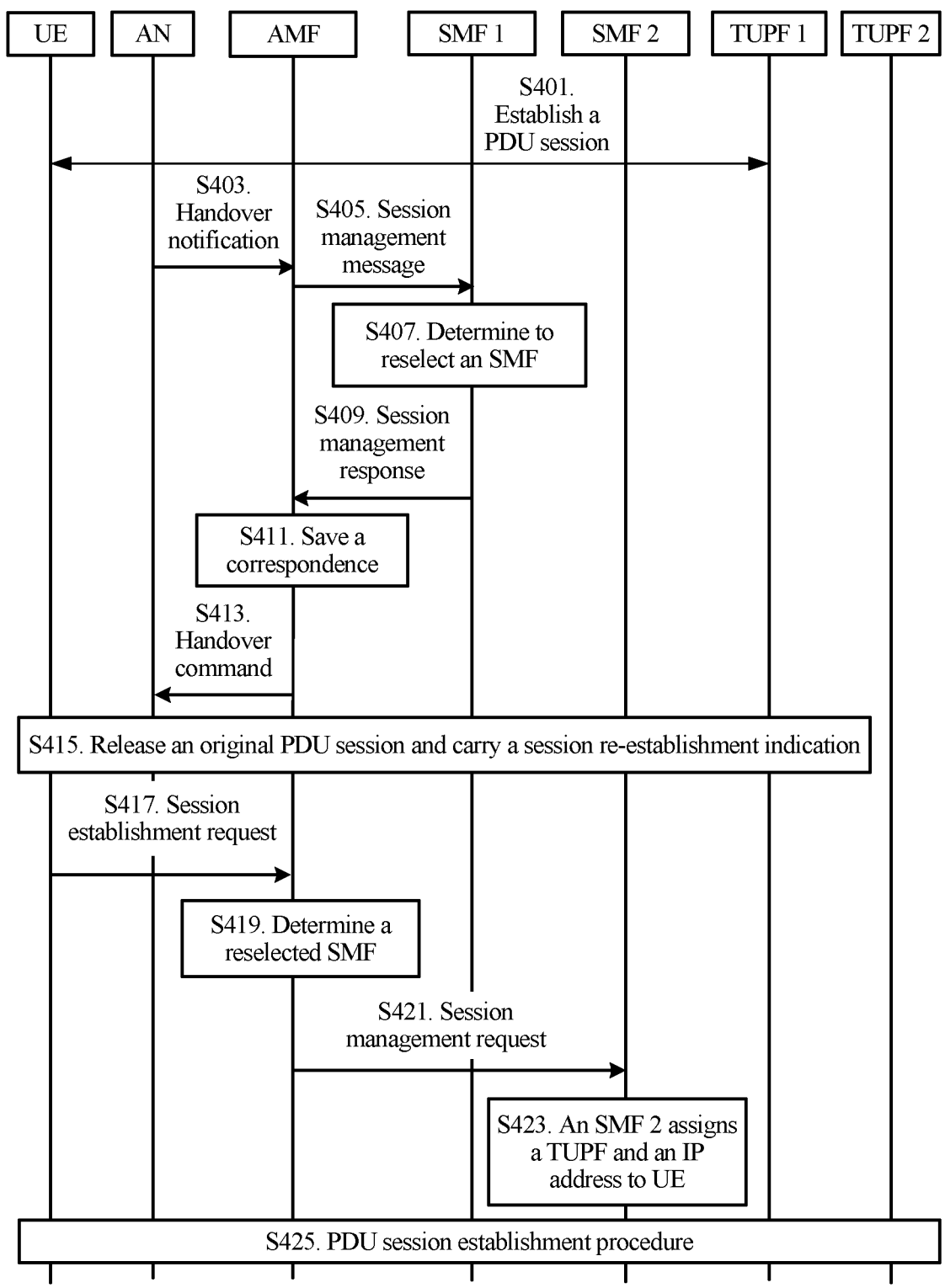
FIG. 4 is a schematic flowchart of a session management function entity selection method according to an embodiment of the present application.

FIG. 4 provides a schematic flowchart of a session management function entity selection method. The method in this method embodiment may be used for interaction between the session management function entity 10 and the session management function entity 20 or interaction with an external network element in FIG. 1. The method in this method embodiment may also be used for interaction between the AMF and the SMF or interaction with an external network element in FIG. 2. In this embodiment, for example, a session and service continuity mode is an SSC mode 2.

S401. UE sends a session establishment request to an AMF by using an AN, and the AMF selects an SMF for a session to provide a service for the session, and saves a correspondence between the SMF and a PDU session. In addition, the AMF sends a session establishment request to the SMF, and the SMF establishes the corresponding PDU session and establishes a user plane transmission path. The AN herein may be a next generation access network. For example, a process of establishing the PDU session is the same as that in some approaches, and details are not described herein.

In step 401, the UE may trigger establishment of one PDU session. For ease of description, the PDU session may be denoted as a PDU session 1. Alternatively, the UE may trigger a process of establishing a plurality of PDU sessions. For ease of description, the plurality of PDU sessions may be separately denoted as sessions such as a PDU session 1 and a PDU session 2.

S403. The UE negotiates with the AN, and when handover needs to be performed, the AN sends a handover notification message to the AMF, and the AMF receives the handover notification message.

There are a relatively large quantity of scenarios in which the UE is handed over, for example, quality of service of a network that currently provides a relatively poor service for the UE, or a network that currently provides a service for the UE is overloaded. Details are not described herein.

The handover notification message includes UE location information (namely, target access area information) and an identifier of the UE. In this embodiment, for example, the target access area information is a target base station identifier.

S405. The AMF determines, based on an identifier of the UE, information about the PDU session established for the UE in S401, and sends a session management message to the SMF corresponding to the established PDU session. For example, in one implementation, if a PDU session 1 and a PDU session 2 are established for the UE in S401, the AMF separately sends the session management message to an SMF 1 that provides a service for the PDU session 1 and an SMF 2 that provides a service for the PDU session 2. The SMF 1 and the SMF 2 may be a same SMF function entity. In the other implementation, if a PDU session 1 is established for the UE in S401, the AMF sends the session management message to an SMF 1 that provides a service for the PDU session 1.

In this embodiment, for example, the PDU session 1 is established for the UE in S401. Correspondingly, the AMF sends the session management message to the SMF 1 corresponding to the PDU session 1, and the SMF 1 receives the session management message.

The session management message carries the identifier of the UE, information about the PDU session 1, and the UE location information.

The information about the PDU session 1 may be an ID of the PDU session 1, or an ID of the UE and an ID of the PDU session 1, or other information that may represent the PDU session 1.

S407. After receiving the session management message, the SMF 1 determines to reselect an SMF.

In an implementation, the SMF determines based on the information about the PDU session 1 that a session and service continuity mode of the corresponding PDU session and the PDU session 1 is an SSC mode 2.

In an implementation, the method in FIG. 1 may be used for the SMF 1 to determine whether to reselect an SMF. For example, the SMF 1 determines, based on load information of the SMF 1, load information of a UPF managed by the SMF 1, or a service range of the SMF 1, to reselect an SMF.

In this embodiment, if a target base station is not within the service range of the SMF 1, the SMF 1 cannot continue to provide a service for the UE. Therefore, the SMF 1 determines to reselect an SMF.

S409. The SMF 1 sends a session management response to the AMF. The session management response carries information about the PDU session 1 and a reselection indication used to instruct to reselect an SMF. The AMF receives the session management response.

The session management response may be a UE mobility event response, or a handover response, or a message in another name. This is not limited herein.

S411. After the AMF receives the session management response, if the response carries the reselection indication, the AMF saves a correspondence between the SMF 1 and the information about the PDU session 1. The correspondence is used by the AMF to reselect an SMF when the AMF subsequently receives a session establishment request from the UE.

The correspondence may be saved in a form such as a table or a chart. This is not limited herein.

In an implementation, the correspondence may further include the reselection indication.

Saved information about the SMF 1 may be a name of the SMF 1, or an ID of the SMF 1, or other information that may represent the SMF 1. This is not limited in this application.

The information about the SMF 1 is saved herein, so that the AMF does not select the SMF 1 when the AMF reselects an SMF subsequently.

S413. The AMF sends a handover command to the AN, to instruct to complete a subsequent handover procedure.

S415. After the handover is completed, the SMF initiates a release procedure of the PDU session 1.

In the release procedure, the SMF further sends a session re-establishment indication, to instruct the UE to initiate an establishment request for a new PDU session after the session is released. The session re-establishment indication may be a specific cause value or a specific indication. This is not limited in this application.

S417. After the original PDU session is released, the UE sends a session establishment request to the AMF, and the AMF receives the session establishment request. The session establishment request includes the information about the PDU session 1.

In this way, the UE initiates establishment of a new PDU session (or a target PDU session) by sending the session establishment request to the AMF. After receiving the information about the PDU session 1, the AMF queries the saved correspondence, so that the AMF does not select the SMF 1 when the AMF reselects an SMF.

The session establishment request carries a PDU session ID assigned by the UE to a new current to-be-established PDU session.

If the UE assigns the ID of the PDU session 1 to the new PDU session, the session establishment request carries the ID of the PDU session 1, or carries the identifier of the UE and the ID of the PDU session 1.

If the UE assigns a new session ID (which is different from the ID of the PDU session 1) to the new PDU session, the session establishment request carries the new session ID and the ID of the PDU session 1, or carries the new session ID, the identifier of the UE, and the ID of the PDU session 1.

The UE assigns a session identifier of an original PDU session (namely, the PDU session 1) to a current to-be-established PDU session because the PDU session 1 is released and the session identifier of the PDU session 1 is also released.

The session establishment request may further carry the UE location information, or may carry DNN information (for example, a DNN identifier).

S419. After receiving the session establishment request, the AMF determines a second SMF different from the first SMF as a reselected SMF, in other words, the second SMF serves the UE.

The method in FIG. 1 may be used for the AMF to determine the second SMF different from the first SMF. Details are not described herein again.

In a process of determining the second SMF, the AMF searches for the saved correspondence to avoid selecting the SMF 1 saved on the AMF.

S421. The AMF sends a session management request to the SMF 2, and the SMF 2 receives the session management request.

In an implementation, the session management request may be a session creation request or may have another name. This is not limited in this application.

S423. The SMF 2 assigns a new TUPF and IP address to the UE.

As an anchor UPF of the newly-established session, the TUPF is configured to establish a user plane path at the new PDU session side. The new IP address is used for data transmission between the UE and a data network.

S425. The SMF 2 initiates an establishment procedure of a new PDU session for the UE.

In the session management function entity selection method provided in this embodiment, because the SMF 1 can sense information about session management, the SMF 1 determines whether to reselect an SMF. If determining to reselect an SMF, the SMF 1 sends the reselection indication to the AMF. The AMF selects an SMF different from the SMF 1 to continue to serve the UE, so that the SMF selected in this method is more proper than an SMF selected by an AMF in some approaches.

In the embodiment shown in FIG. 4, the AMF receives the handover notification message in step 403. In an implementation, a session management function entity is selected in a UE location area update scenario. A main difference between a procedure of the session management function entity selection method in the location area update scenario and the procedure in the handover scenario described in FIG. 4 lies in S403, S413, and S415.

Corresponding to S403 in FIG. 4, a main difference between a procedure in S403 in the location area update scenario and the procedure in the handover scenario is described as follows.

The UE initiates a location area update request message to the AMF by using a target AN. The request message may be triggered because the UE moves to a new location area, or a timer triggers the UE to initiate a periodic location area update, or the UE moves to another network coverage area, or the like.

Correspondingly, corresponding to S413, the AMF sends a location area update response message (TAU Response or TAU Accept message) to the AN. Indication information carried in the message remains unchanged.

Correspondingly, corresponding to S415, because the UE is in an idle state in this case, the original PDU session does not have an air interface bearer. Before a release procedure of the original PDU session is triggered, a process of establishing a user plane connection among the UE, the target AN, and a UPF further needs to be performed. Steps other than S403, S413, and S415 are consistent with the procedure in the handover scenario.

In the embodiment shown in FIG. 4, when sending the session management message to the SMF, the AMF sends, at a granularity of a PDU session, the session management message to an SMF corresponding to each PDU session. In this way, if an SMF simultaneously provides services for a plurality of PDU sessions of the UE, the SMF may receive a plurality of session management messages in the procedure.

In another possible implementation, the AMF may send, at a granularity of an SMF, the session management message to an SMF that currently serves the UE. For example, a same SMF that provides services for a plurality of PDU sessions of the UE receives only one session management message in the procedure. A main difference between the procedure in this message notification mode and the original procedure lies in S405, S407, S409, and S411. Detailed differences are as follows.

A process of establishing a plurality of PDU sessions may be involved in S401. Therefore, for ease of description herein, for example, the UE establishes three PDU sessions, a PDU session 1, a PDU session 2, and a PDU session 3. The SMF 1 provides services for the PDU session 1 and the PDU session 2, and the SMF 2 provides a service for the PDU session 3.

Corresponding to FIG. 4, a main difference between a procedure in a new message notification mode and a current procedure is described as follows. S405 is corresponding to S405'. After the AMF receives the handover notification message sent by the AN, the AMF determines, based on the identifier of the UE in the handover notification message and the correspondence that is between the PDU session and the SMF and that is saved in S401, information about an SMF that provides a service for the UE. In this example, corresponding to the SMF 1 and the SMF 2, the AMF sends the session management message to the SMF 1 and the SMF 2. The session management message carries the identifier of the UE and the UE location information.

Correspondingly, S407 is corresponding to S407'. After receiving the session management message sent by the AMF, each SMF first determines, based on the identifier of the UE, each PDU session (in this example, as a query result, the SMF 1 finds the PDU session 1 and the PDU session 2, and the SMF 2 finds the PDU session 3) in which the SMF provides a service for the UE, and then determines whether to reselect an SMF for each PDU session. A basis for determining whether to reselect an SMF is consistent with a manner described in the procedure in FIG. 4. It is assumed herein that the SMF 1 determines to reselect SMFs for the PDU session 1 and the PDU session 2, and the SMF 2 determines to reselect an SMF for the PDU session 3.

Correspondingly, S409 is corresponding to S409'. After determining to reselect an SMF for a PDU session for which a service is provided, each SMF returns the session management response to the AMF, and adds, to the session management response, a reselection indication and the PDU session in which the SMF needs to be reselected. In this example, because SMFs need to be reselected for both the PDU session 1 and the PDU session 2, the SMF 1 simultaneously returns the reselection indication and information about the PDU session 1 and the PDU session 2, and the SMF 2 returns the reselection indication and information about the PDU session 3.

In an implementation, if SMFs need to be reselected for a plurality of PDU sessions for which one SMF provides services, the SMF may return one reselection indication in the session management response, or each PDU session in which reselection needs to be performed has one reselection indication. For example, in the foregoing example, the SMF 1 may return information about the PDU session 1, information about the PDU session 2, and one reselection indication; or may return information about the PDU session 1, a reselection indication 1 used to instruct to perform reselection for the PDU session 1, information about the PDU session 2, and a reselection indication 2 used to instruct to perform reselection for the PDU session 2. In an implementation, a combination of the foregoing two manners may also be used, for example, one reselection indication corresponding to one PDU session is used in combination with one reselection indication corresponding to a plurality of PDU sessions. Certainly, another manner may be used. This is not limited in this application.

The reselection indication may be a specific cause value or a specific indication. This is not limited in the present application.

Correspondingly, S411 is corresponding to S411'. After the AMF receives session management responses returned by the SMF 1 and the SMF 2, if the response carries a reselection indication and information about a PDU session in which an SMF is to be reselected, or carries information about a PDU session in which an SMF is to be reselected, the AMF saves a correspondence between the information about the corresponding PDU session and the SMF that currently provides a service for the PDU session. A storage format is consistent with a manner described in the procedure in FIG. 4. The correspondence is used by the AMF to reselect an SMF when the AMF subsequently receives a session establishment request from the UE.

In another possible implementation, in the embodiment shown in FIG. 4, step 407 is triggered by the session management message sent by the AMF. In an implementation, a session management function entity is selected in a scenario in which the SMF determines that a UPF corresponding to the PDU session 1 is overloaded, an SMF corresponding to the PDU session 1 is overloaded, or the like. A main difference between a procedure of the session management function entity selection method in this scenario and the procedure in the handover scenario shown in FIG. 4 lies in S403, S405, S409, S413, and S415.

For example, corresponding to S403 and S405 in FIG. 4, a main difference between procedures in S403 and S405 in the scenario in which the UPF or the SMF is overloaded and the procedures in the handover scenario is described as follows.

The SMF directly obtains a factor such as UPF or SMF load based on the SMF or a message from another function entity, and triggers step S407. The message may include information such as a UPF load status, an SMF load status, or a UPF fault.

Correspondingly, corresponding to S409, the message may be a session management notification message or another message. This is not limited herein. Indication information carried in the message remains unchanged.

Correspondingly, corresponding to S413, the AMF does not perform the step because the procedure is not triggered by the UE or the AN.

Corresponding to S415, the AMF forwards the message to send a session re-establishment indication to the UE. In an implementation, step 415 may be separately performed from step S409, or may be performed in combination with step S409. Steps other than S403, S405, S409, S413, and S415 are consistent with the procedure in the handover scenario.

In the embodiment shown in FIG. 4, an action of the AMF may be performed by the AMF based on the software module in the above-mentioned memory. This is not limited in this embodiment of the present application.

Figure 5:
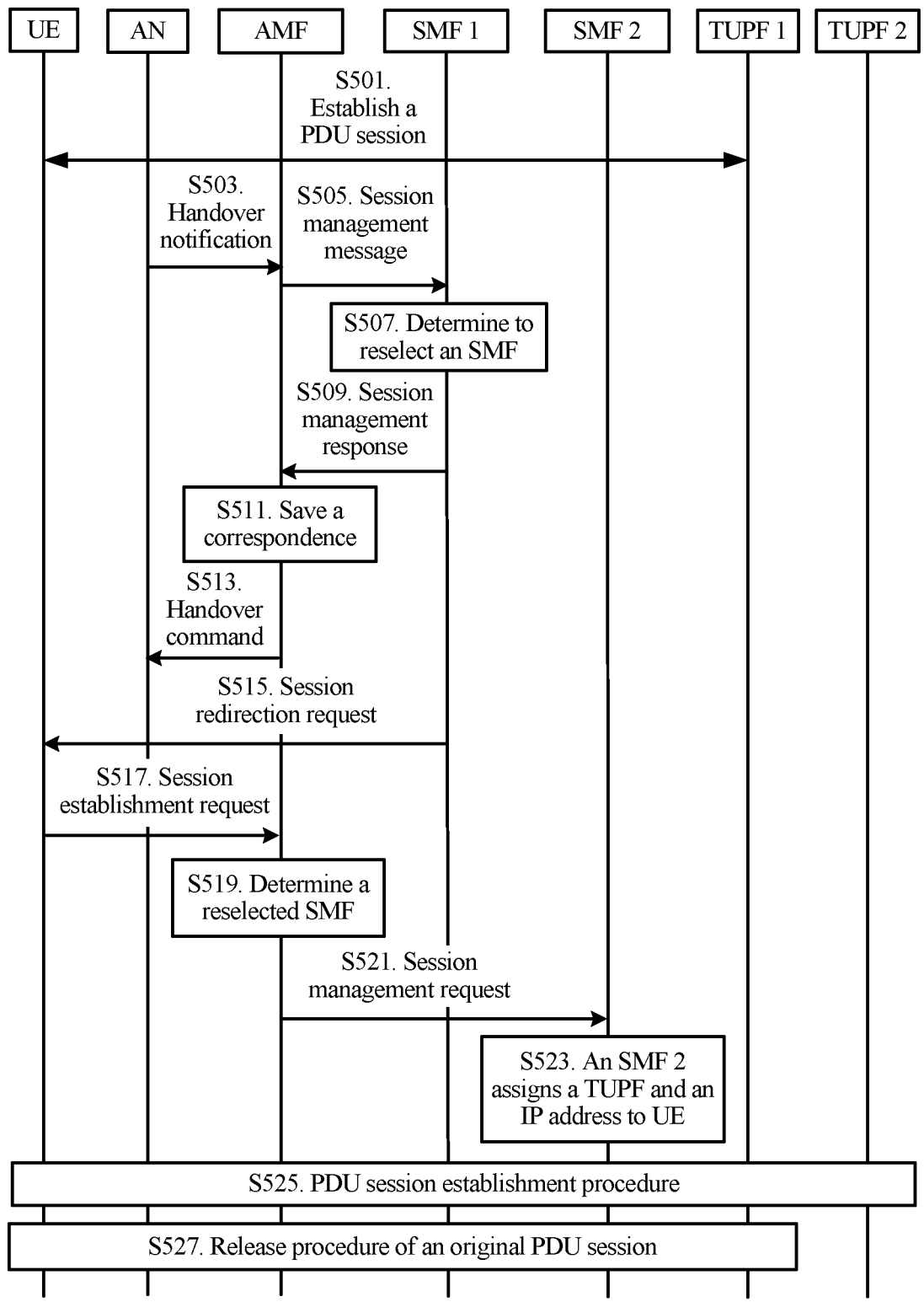
FIG. 5 is a schematic flowchart of another session management function entity selection method according to an embodiment of the present application.

FIG. 5 provides a schematic flowchart of another session management function entity selection method. The method in this method embodiment may be used for interaction between the session management function entity 10 and the session management function entity 20 or interaction with an external network element in FIG. 1. The method in this method embodiment may also be used for interaction between the AMF and the SMF or interaction with an external network element in FIG. 2. In this embodiment, for example, a session and service continuity mode is an SSC mode 3.

S501, S503, and S505 are the same as S401, S403, and S405.

S507. After receiving the session management message, the SMF 1 determines whether to reselect an SMF.

In an implementation, the SMF determines based on the information about the PDU session 1 that a session and service continuity mode of the corresponding PDU session and the PDU session 1 is an SSC mode 3.

In an implementation, the method in FIG. 1 may be used for the SMF 1 to determine whether to reselect an SMF.

S509 to S513 are the same as S409 to S413.

S515. After the handover is completed, the SMF sends a session redirection request to the UE, and adds a session re-establishment indication to the request, to instruct the UE to initiate establishment of a new PDU session. The UE receives the redirection request.

The session redirection request may be a session re-establishment request or may have another message name. This is not limited herein.

S517 to S525 are the same as S417 to S425.

S527. After a service flow on the original PDU session ends, the original PDU session is released in a release procedure of the original PDU session.

In the session management function entity selection method provided in this embodiment, because the SMF 1 can sense information about session management, the SMF 1 determines the reselected SMF, so that the SMF selected in this method is more proper than an SMF selected by an AMF in some approaches.

A main difference between a procedure of the session management function entity selection method in a location area update scenario and the procedure in the handover scenario described in FIG. 5 lies in S503 and S513.

In the location area update scenario, corresponding to S503, the UE initiates a location area update request to the AMF by using a target AN. Correspondingly, corresponding to S513, the AMF sends a location area update response message to the AN.

In the embodiment shown in FIG. 5, when sending the session management message to the SMF, the AMF sends, at a granularity of a PDU session, the session management message to an SMF corresponding to each PDU session. In this way, if an SMF simultaneously provides services for a plurality of PDU sessions of the UE, the SMF may receive a plurality of session management messages in the procedure.

In another possible implementation, the AMF may send, at a granularity of an SMF, the session management message to an SMF that currently serves the UE. For example, a same SMF that provides services for a plurality of PDU sessions of the UE receives only one session management message in the procedure. A main difference between the procedure in this message notification mode and the original procedure lies in S505, S507, S509, and S511. S505, S507, S509, and S511 are respectively replaced with S505', S507', S509', and S511'. S505', S507', S509', and S511' are respectively the same as S405', S407', S409', and S411'. Details are not described herein again.

In another possible implementation, step 507 is triggered by the session management message sent by the AMF. In an implementation, a session management function entity is selected in a scenario in which the SMF determines that a UPF corresponding to the PDU session 1 is overloaded, an SMF corresponding to the PDU session 1 is overloaded, or the like. A main difference between a procedure of the session management function entity selection method in this scenario and the procedure in the handover scenario described in FIG. 5 lies in S503, S505, S509, S513, and S515.

For example, corresponding to S503 and S505 in FIG. 5, a main difference between procedures in S503 and S505 in the scenario in which the UPF or the SMF is overloaded and the procedures in the handover scenario is described as follows. The SMF directly obtains a factor such as UPF or SMF load based on the SMF or a message from another function entity, and triggers step S507. The message may include information such as a UPF load status, an SMF load status, or a UPF fault.

Correspondingly, corresponding to S513, the AMF does not perform the step because the procedure is not triggered by the UE or the AN.

Corresponding to S515, the AMF forwards the message to send a session re-establishment indication to the UE. In an implementation, the step may be separately performed from step S509, or may be performed in combination with step S509. Steps other than S503, S505, S509, S513, and S515 are consistent with the procedure in the handover scenario.

In the embodiment shown in FIG. 5, an action of the AMF may be performed by the AMF based on the software module in the above-mentioned memory. This is not limited in this embodiment of the present application.

Figure 6:
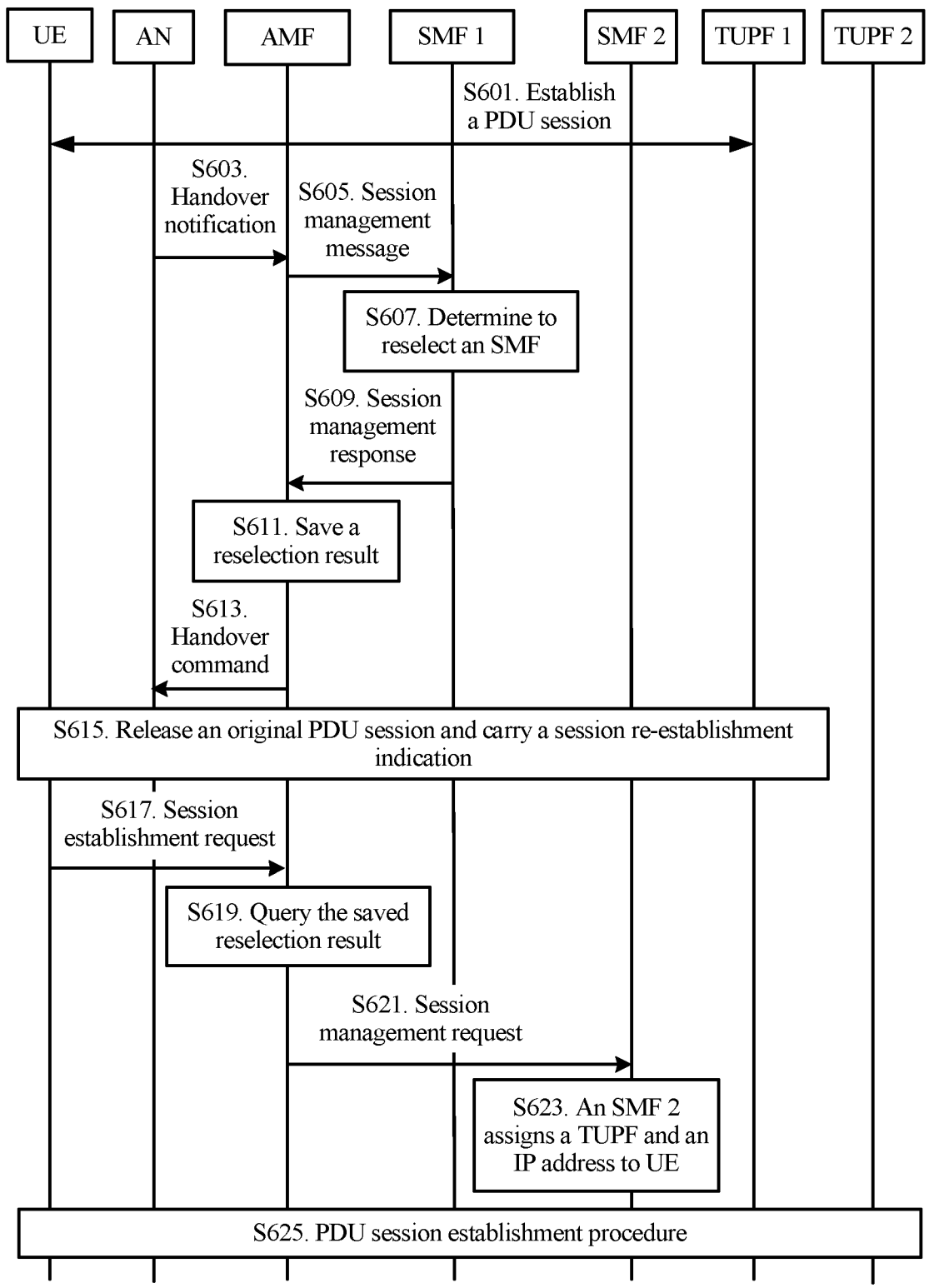
FIG. 6 is a schematic flowchart of another session management function entity selection method according to an embodiment of the present application.

FIG. 6 provides a schematic flowchart of another session management function entity selection method. The method in this method embodiment may be used for interaction between the session management function entity 10 and the session management function entity 20 or interaction with an external network element in FIG. 1. The method in this method embodiment may also be used for interaction between the AMF and the SMF or interaction with an external network element in FIG. 2. In this embodiment, for example, a session and service continuity mode is an SSC mode 2.

S601 to S605 are the same as S401 to S405.

S607. After receiving the session management message, the SMF 1 determines whether to reselect an SMF. If determining to reselect an SMF, the SMF 1 determines a second SMF, in other words, the second SMF is the reselected SMF, and the second SMF serves the UE.

In an implementation, the SMF determines based on the information about the PDU session 1 that a session and service continuity mode of the corresponding PDU session and the PDU session 1 is an SSC mode 2.

A method in which the SMF 1 determines whether to reselect an SMF is the same as that described in S407.

The method in which the session management function entity 20 determines the reselected third session management function entity in FIG. 1 may be used for the SMF 1 to determine the second SMF. For example, a topology management function entity obtains load information of another SMF or load information of another UPF, and determines an SMF that is different from the SMF 1 and that can provide a service for the UE to provide a service for the UE.

S609. The SMF 1 sends a session management response to the AMF. The session management response carries information about the PDU session 1 and an SMF reselection result, and the SMF reselection result herein is information about the second SMF. The AMF receives the session management response.

S611. After receiving the session management response, the AMF saves a correspondence between the information about the PDU session 1 and the information about the second SMF. The correspondence is used by the AMF to subsequently select, when the AMF receives a session establishment request from the UE, the second SMF as the SMF that serves the UE.

The correspondence may be saved in a form such as a table or a chart. This is not limited herein.

In an implementation, the correspondence may further include indication information that the SMF needs to be reselected. The indication information that the SMF needs to be reselected may be a specific indication or a specific cause value. This is not limited in this application.

The saved information about the second SMF may be a name of the second SMF, or an ID of the second SMF, or other information that may represent the SMF. This is not limited in this application.

S613 to S617 are the same as S413 to S417.

S619. After receiving the session establishment request, the AMF queries the correspondence to determine that the information about the PDU session 1 is corresponding to the SMF 2, in other words, selects the second SMF to serve the UE.

In a process of determining the second SMF, the AMF queries, based on the information that is about the PDU session 1 and that is carried in a session establishment request message, the correspondence to determine the SMF 2.

S621 to S625 are the same as S421 to S425.

In the session management function entity selection method provided in this embodiment, because the SMF 1 can sense information about session management, the SMF 1 determines whether to reselect an SMF. If determining to reselect an SMF, the SMF 1 determines the reselected SMF and sends the reselection result to the AMF, so that the SMF selected in this method is more proper than an SMF selected by an AMF in some approaches.

In an implementation, the method described in FIG. 6 is also applicable to a UE location area update scenario. A main difference between a procedure of the session management function entity selection method in the location area update scenario and the procedure in the handover scenario described in FIG. 6 lies in S603, S613, and S615.

Corresponding to S603 in FIG. 6, a main difference between a procedure in S603 in the location area update scenario and the procedure in the handover scenario in FIG. 6 is described as follows.

The UE initiates a location area update request message to the AMF by using a target AN. The request message may be triggered because the UE moves to a new location area, or a timer triggers the UE to initiate a periodic location area update, or the UE moves to another network coverage area, or the like.

Correspondingly, corresponding to S613, the AMF sends a location area update response message to the AN. Indication information carried in the message remains unchanged. The location area update response message may be a TAU response or TAU accept message or may have another name.

Correspondingly, corresponding to S615, because the UE is in an idle state in this case, the original PDU session does not have an air interface bearer. Before a release procedure of the original PDU session is triggered, a process of establishing a user plane connection among the UE, the target AN, and a UPF further needs to be performed. Steps other than S603, S613, and S615 are consistent with the procedure in the handover scenario.

In the embodiment shown in FIG. 6, when sending the session management message to the SMF, the AMF sends, at a granularity of a PDU session, the session management message to an SMF corresponding to each PDU session. In this way, if an SMF simultaneously provides services for a plurality of PDU sessions of the UE, the SMF may receive a plurality of session management messages in the procedure.

In another possible implementation, the AMF may send, at a granularity of an SMF, the session management message to an SMF that currently serves the UE. For example, a same SMF that provides services for a plurality of PDU sessions of the UE receives only one session management message in the procedure. A main difference between the procedure in this message notification mode and the original procedure lies in S605, S607, S609, and S611. Detailed differences are as follows.

A process of establishing a plurality of PDU sessions may be involved in S601. Therefore, for ease of description herein, for example, the UE establishes three PDU sessions, a PDU session 1, a PDU session 2, and a PDU session 3. The SMF 1 provides services for the PDU session 1 and the PDU session 2, and the SMF 2 provides a service for the PDU session 3.

Corresponding to FIG. 6, a main difference between a procedure in a new message notification mode and a current procedure is described as follows.

S605 is corresponding to S605'. After the AMF receives the handover notification message sent by the AN, the AMF determines, based on the identifier of the UE in the handover notification message and the correspondence that is between the PDU session and the SMF and that is saved in S601, information about an SMF that provides a service for the UE. In this example, corresponding to the SMF 1 and the SMF 2, the AMF sends the session management message to the SMF 1 and the SMF 2.

The session management message carries the identifier of the UE and the UE location information.

Correspondingly, S607 is corresponding to S607'. After receiving the session management message sent by the AMF, each SMF first determines, based on the identifier of the UE, each PDU session (in this example, as a query result, the SMF 1 finds the PDU session 1 and the PDU session 2, and the SMF 2 finds the PDU session 3) in which the SMF provides a service for the UE, and then determines whether to reselect an SMF for each PDU session. If the SMF needs to be reselected, an SMF reselection operation is performed to determine that another SMF provides the service for the UE. A basis for determining whether to reselect an SMF and a reselection process are consistent with a manner described in the procedure in FIG. 6. In this case, it is assumed that the SMF 1 determines to reselect SMFs for the PDU session 1 and the PDU session 2, and respectively selects an SMF 3 and an SMF 4 for the PDU session 1 and the PDU session 2 to provide services, and the SMF 2 determines to reselect an SMF for the PDU session 3, and selects an SMF 5 for the PDU session 3 to provide a service. The SMF 3, the SMF 4, and the SMF 5 may be a same SMF or different SMFs.

Correspondingly, S609 is corresponding to S609'. After determining to reselect an SMF for a PDU session for which a service is provided, each SMF returns the session management response to the AMF, and adds, to the session management response, session information and an SMF reselection result. In this example, because SMFs need to be reselected for both the PDU session 1 and the PDU session 2, the SMF 1 simultaneously returns information about the PDU session 1 and the PDU session 2 and the SMF reselection result, namely, information about the SMF 3 and the SMF 4, and the SMF 2 returns information about the PDU session 3 and the SMF reselection result, namely, information about the SMF 5.

Correspondingly, S611 is corresponding to S611'. After the AMF receives session management responses returned by the SMF 1 and the SMF 2, if the response carries a reselection result and information about a PDU session in which an SMF needs to be reselected, the AMF saves a correspondence between the information about the corresponding PDU session and information about the reselected SMF. A storage format is consistent with a manner described in the procedure in FIG. 6. The correspondence is used by the AMF to subsequently select, when the AMF receives a session establishment request from the UE, the corresponding SMF for the AMF to provide a service.

In another possible implementation, step 607 is triggered by the session management message sent by the AMF. In an implementation, a session management function entity is selected in a scenario in which the SMF determines that a UPF corresponding to the PDU session 1 is overloaded, an SMF corresponding to the PDU session 1 is overloaded, or the like. A main difference between a procedure of the session management function entity selection method in this scenario and the procedure in the handover scenario described in FIG. 6 lies in S603, S605, S609, S613, and S615. Detailed differences are similar to descriptions in FIG. 4. Details are not described herein again.

In the embodiment shown in FIG. 6, an action of the AMF may be performed by the AMF based on the software module in the above-mentioned memory. This is not limited in this embodiment of the present application.

Figure 7:
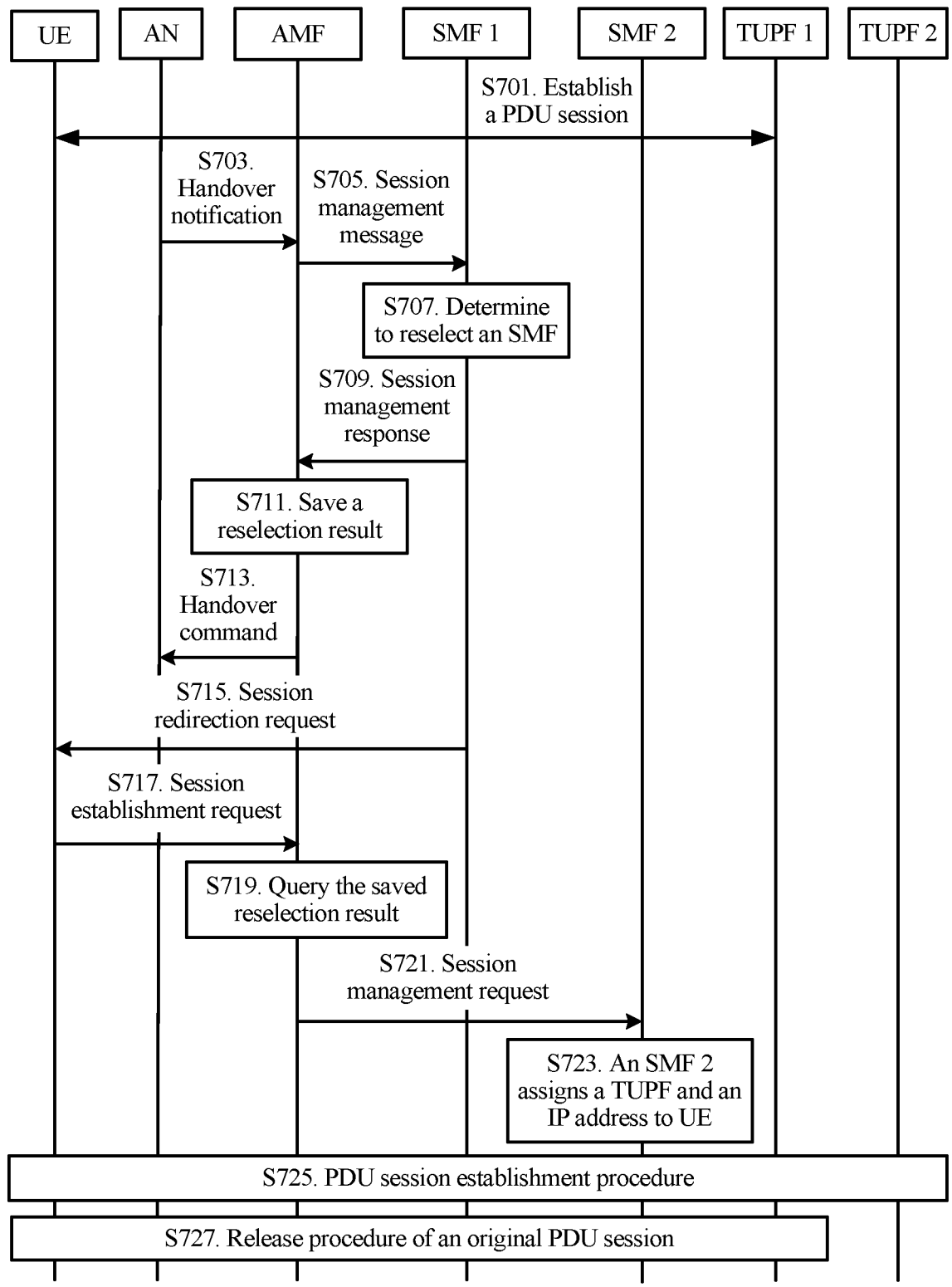
FIG. 7 is a schematic flowchart of another session management function entity selection method according to an embodiment of the present application.

FIG. 7 provides a schematic flowchart of another session management function entity selection method. The method in this method embodiment may be used for interaction between the session management function entity 10 and the session management function entity 20 or interaction with an external network element in FIG. 1. The method in this method embodiment may also be used for interaction between the AMF and the SMF or interaction with an external network element in FIG. 2. In this embodiment, for example, a session and service continuity mode is an SSC mode 3.

S701 to S705 are the same as S601 to S605.

S707. After receiving the session management message, the SMF 1 determines whether to reselect an SMF. If determining to reselect an SMF, the SMF 1 determines a second SMF, in other words, the second SMF is the reselected SMF, and the second SMF serves the UE.

In an implementation, the SMF determines based on the information about the PDU session 1 that a session and service continuity mode of the corresponding PDU session and the PDU session 1 is an SSC mode 3.

S709 and S711 are the same as S609 and S611.

S713 and S715 are the same as S513 and S515.

S717 to S725 are the same as S617 to S625.

S727. After a service flow on the original PDU session ends, the original PDU session is released in a release procedure of the original PDU session.

In the session management function entity selection method provided in this embodiment, because the SMF 1 can sense information about session management, the SMF 1 determines the reselected SMF, so that the SMF selected in this method is more proper than an SMF selected by an AMF in some approaches.

A main difference between a procedure of the session management function entity selection method in a location area update scenario and the procedure in the handover scenario described in FIG. 6 lies in S703 and S713 are different from S603 and S613.

Corresponding to FIG. 7, in the location area update scenario, corresponding to S703, the UE initiates a location area update request to the AMF by using a target AN. Correspondingly, corresponding to S713, the AMF sends a location area update response message to the AN.

In the embodiment shown in FIG. 7, when sending the session management message to the SMF, the AMF sends, at a granularity of a PDU session, the session management message to an SMF corresponding to each PDU session. In this way, if an SMF simultaneously provides services for a plurality of PDU sessions of the UE, the SMF may receive a plurality of session management messages in the procedure.

In another possible implementation, the AMF may send, at a granularity of an SMF, the session management message to an SMF that currently serves the UE. For example, a same SMF that provides services for a plurality of PDU sessions of the UE receives only one session management message in the procedure. A main difference between the procedure in this message notification mode and the original procedure lies in S705, S707, S709, and S711. S705, S707, S709, and S711 are respectively replaced with S705', S707', S709', and S711'. S705', S707', S709', and S711' are respectively the same as S605', S607', S609', and S611'. Details are not described herein again.

In another possible implementation, step 707 is triggered by the session management message sent by the AMF. In an implementation, a session management function entity is selected in a scenario in which the SMF determines that a UPF corresponding to the PDU session 1 is overloaded, an SMF corresponding to the PDU session 1 is overloaded, or the like. A main difference between a procedure of the session management function entity selection method in this scenario and the procedure in the handover scenario described in FIG. 7 lies in S703, S705, S709, S713, and S715. Detailed differences are similar to descriptions in FIG. 5. Details are not described herein again.

In the embodiment shown in FIG. 7, an action of the AMF may be performed by the AMF based on the software module in the above-mentioned memory. This is not limited in this embodiment of the present application.

Figure 8:
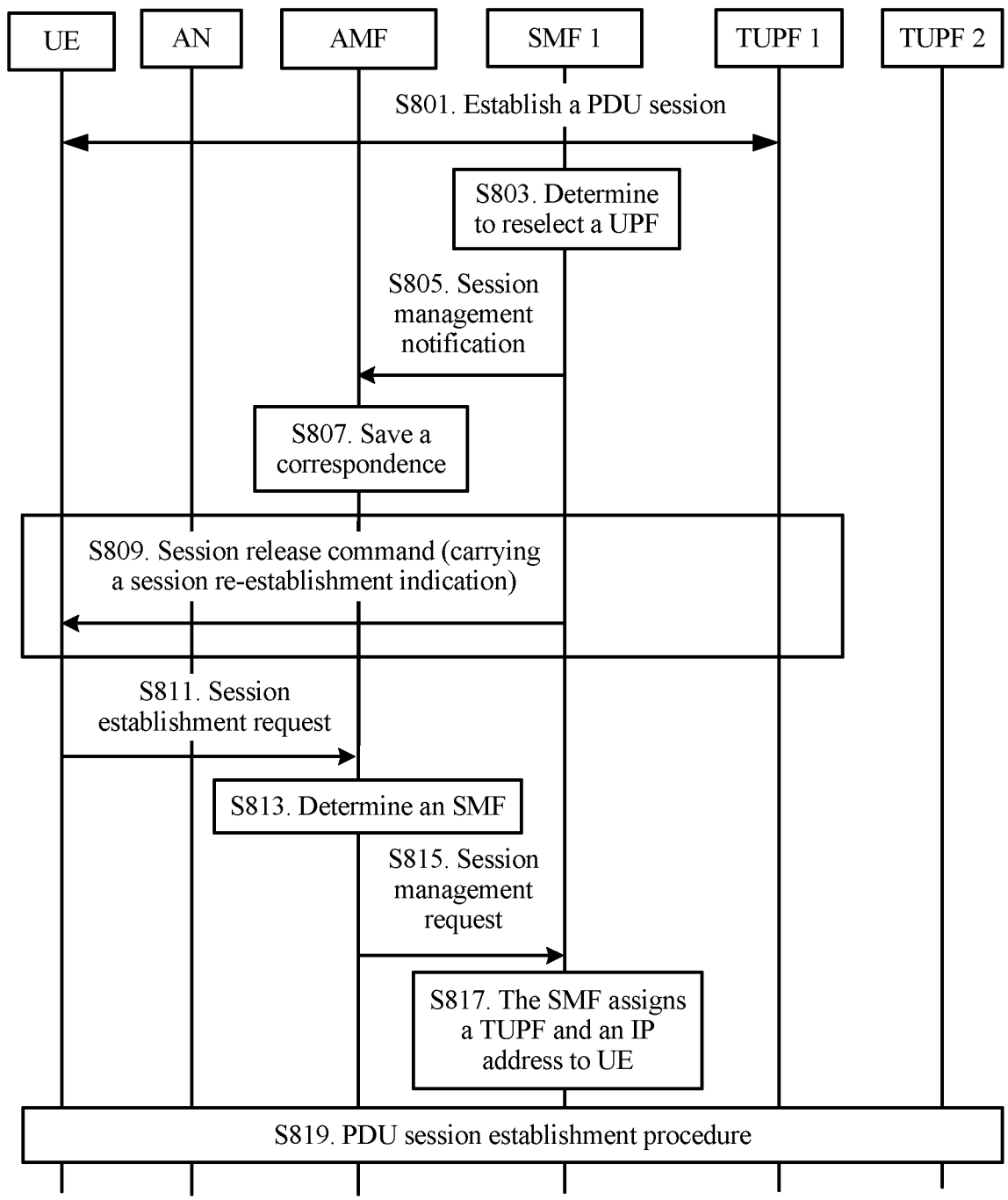
FIG. 8 is a schematic flowchart of another session management function entity selection method according to an embodiment of the present application.

FIG. 8 provides a schematic flowchart of a session management function entity selection method. The method in this method embodiment may be used for interaction between the session management function entity 10 and the session management function entity 20 or interaction with an external network element in FIG. 1. The method in this method embodiment may also be used for interaction between the AMF and the SMF or interaction with an external network element in FIG. 2. In this embodiment, for example, a session and service continuity mode is an SSC mode 2. A UPF needs to be reselected, but an SMF does not need to be reselected.

S801 is the same as S401.

S803. An SMF 1 determines to reselect a UPF for a PDU session on the UE. For ease of description, a PDU session 1 herein is used as an example.

In an implementation, the step may be triggered by UE location information, UPF load information, load information of the SMF 1, or the like, or may be triggered by other information. This is not limited in this application.

In an implementation, the SMF 1 determines based on the information about the PDU session 1 that a session and service continuity mode of the corresponding PDU session and the PDU session 1 is an SSC mode 2.

In an implementation, the method in FIG. 1 may be used for the SMF 1 to determine to reselect a UPF.

In this embodiment, if a source UPF cannot provide a service for the UE because the source UPF is overloaded or faulty, a target access area is still within a service range of the SMF 1, and information about another UPF managed by the SMF 1 meets a condition for serving the UE, the SMF 1 may continue to provide a service for the UE. Therefore, the SMF 1 determines to reselect a UPF.

S805. The SMF 1 returns a session management notification, and adds indication information and information about a PDU session 1 to the notification.

In an implementation, the SMF 1 may add information about the PDU session 1 and information about the SMF 1 to the session management notification returned by the SMF 1.

The session management notification may be a UE mobility event notification, or a session management event notification, or may have another name. This is not limited herein.

S807. After receiving the session management notification, the AMF saves a correspondence between the SMF 1 and the information about the PDU session 1. The correspondence is used by the AMF to reselect an SMF when the AMF subsequently receives a session establishment request from the UE.

In an implementation, if the session management notification sent by the SMF 1 carries the indication information in S805, the correspondence may also include the indication information.

The information about the SMF 1 is saved herein, so that when subsequently reselecting an SMF, the AMF continues to select the SMF 1 to provide a service for the UE.

The indication information is saved herein, so that the AMF does not select an SMF different from the SMF 1 when the AMF subsequently selects an SMF. The indication information may be in a plurality of forms, as described in FIG. 1.

S809. Because the PDU session is in an SSC mode 2, the SMF further initiates a PDU session release command to the UE, and adds a session re-establishment indication to the command. The command is forwarded by the AMF in a transmission process.

In an implementation, the command may be sent in combination with the notification in S805. This is not limited herein.

S811. Different from S417, after receiving the information about the PDU session 1, the AMF queries the saved correspondence to ensure that when selecting the SMF, the AMF continues to select the SMF 1 to provide a service for the UE.

Other content is the same as that in S417.

S813. After receiving the session establishment request, the AMF determines to continue to select a first SMF, namely, the SMF 1, to serve the UE.

In a process of determining the first SMF, the AMF searches for the saved correspondence to avoid selecting an SMF different from the SMF 1 saved on the AMF.

S815. The AMF sends a session management request to the SMF 1, and the SMF 1 receives the session management request.

In an implementation, the session management request may be a session creation request or may have another name. This is not limited in this application.

S817. Processing of the SMF 1 is the same as processing of an SMF 2 in S423.

S819. The SMF 1 initiates an establishment procedure of a new PDU session for the UE.

In the session management function entity selection method provided in this embodiment, because the SMF 1 can sense information about session management, an SMF determined by the SMF 1 is more proper than an SMF selected by an AMF in some approaches.

Figure 9:
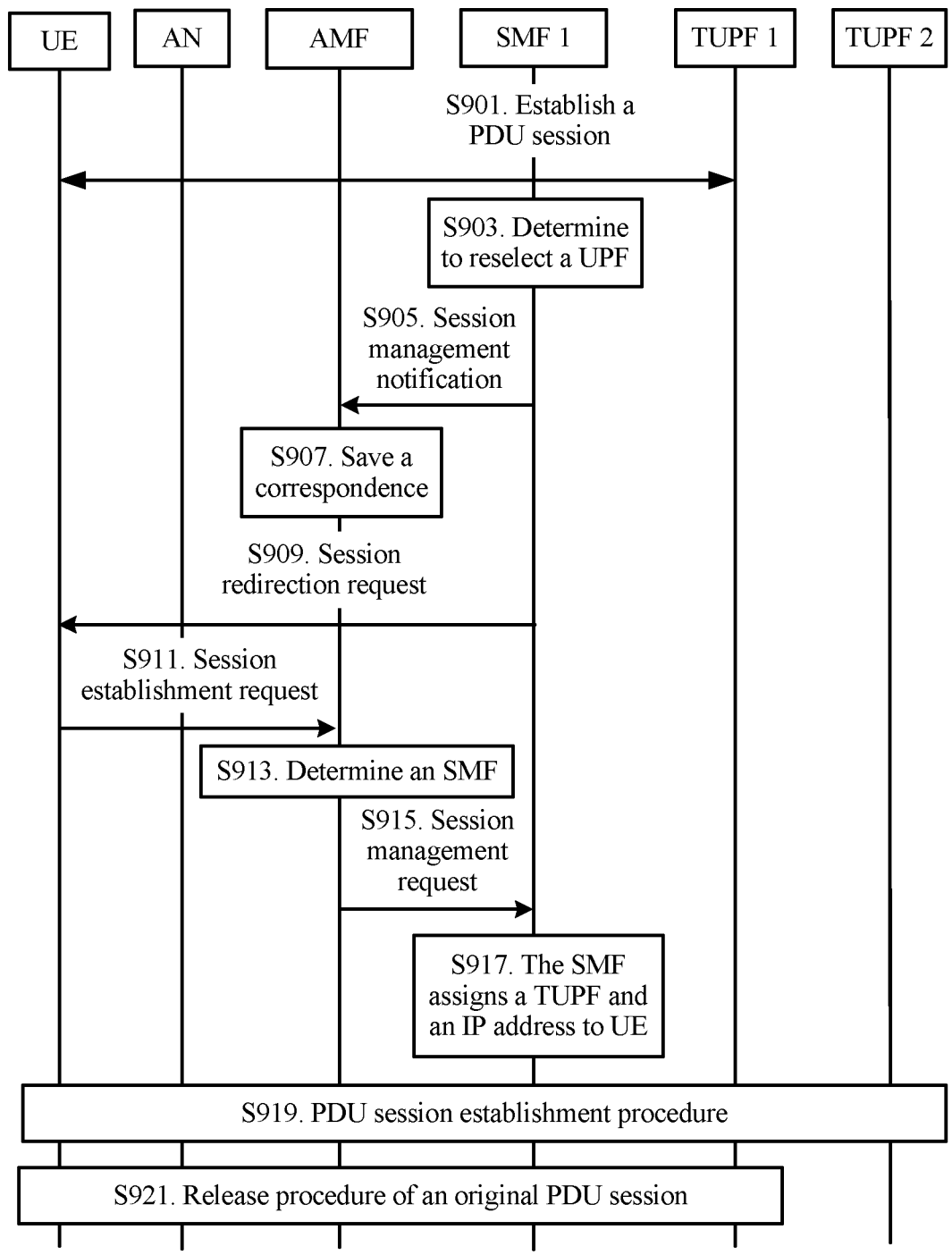
FIG. 9 is a schematic flowchart of another session management function entity selection method according to an embodiment of the present application.

FIG. 9 provides a schematic flowchart of a session management function entity selection method. The method in this method embodiment may be used for interaction between the session management function entity 10 and the session management function entity 20 or interaction with an external network element in FIG. 1. The method in this method embodiment may also be used for interaction between the AMF and the SMF or interaction with an external network element in FIG. 2. In this embodiment, for example, a session and service continuity mode is an SSC mode 3. A UPF needs to be reselected, but an SMF does not need to be reselected.

S901 is the same as S401.

S903. An SMF 1 determines to reselect a UPF for a PDU session on the UE. For ease of description, a PDU session 1 herein is used as an example.

In an implementation, the step may be triggered by UE location information, UPF load information, or load information of the SMF 1, or may be triggered by other information. This is not limited in the present application.

In an implementation, the SMF 1 determines based on the information about the PDU session 1 that a session and service continuity mode of the corresponding PDU session and the PDU session 1 is an SSC mode 3.

In an implementation, the method in FIG. 1 may be used for the SMF 1 to determine to reselect a UPF.

In this embodiment, if a current UPF cannot provide a service for the UE because the current UPF is overloaded or faulty, and a target access area is still within a service range of the SMF 1, the SMF 1 may continue to provide a service for the UE. Therefore, the SMF 1 determines to reselect a UPF.

S905 and S907 are the same as S805 and S807.

S909. Because the PDU session is in an SSC mode 3, the SMF further initiates a session redirection request to the UE, and adds a session re-establishment indication to the request. The request is forwarded by the AMF in a transmission process. The session re-establishment indication is used to instruct the UE to initiate an establishment request for a new PDU session.

In an implementation, the request may be sent in combination with the notification in S905. This is not limited herein.

S911 to S919 are the same as S811 to S819.

S921 is the same as S527.

In the session management function entity selection method provided in this embodiment, because the SMF 1 can sense information about session management, an SMF determined by the SMF 1 is more proper than an SMF selected by an AMF in some approaches.

The foregoing mainly describes the solutions provided in the embodiments of the present application from the perspective of interaction between network elements. It may be understood that, to implement the foregoing functions, the foregoing device (or apparatus) that implements the mobility management function entity or the session management function entity includes a corresponding hardware structure and/or software module for performing each function. Persons of ordinary skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. Persons skilled in the art may use different methods to implement the described functions for each particular application, but it should not be considered that the implementation goes beyond the scope of the present application.

In the embodiments of the present application, function module division may be performed on the mobility management function entity or the session management function entity based on the foregoing method examples. For example, each function module may be obtained through division based on each corresponding function, or two or more functions may be integrated into one processing module. The integrated module may be implemented in a form of hardware, or may be implemented in a form of a function module of software. It should be noted that the module division in the embodiments of the present application is an example, and is merely logical function division. There may be another division manner in an actual implementation.

Figure 10:
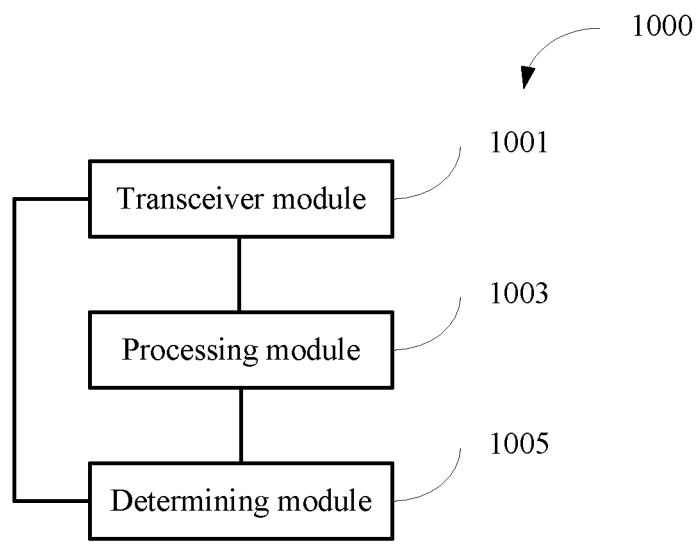
FIG. 10 is a schematic structural diagram of a session management function entity selection apparatus according to an embodiment of the present application.

For example, when each function module is obtained through division based on each corresponding function, FIG. 10 is a possible schematic structural diagram of a session management function entity selection apparatus in the foregoing embodiments. The apparatus 1000 includes a transceiver module 1001, a processing module 1003, and a determining module 1005.

The transceiver module is configured to receive a location change notification message, send a session management message to a first session management function entity, receive a reselection indication and information about a first session of user equipment UE from the first session management function entity, where the reselection indication, is used to instruct to reselect a session management function entity.

The processing module is configured to save a correspondence between the first session management function entity and the information about the first session according to the reselection indication.

The transceiver module is further configured to receive a session establishment request message, where the session establishment request message carries the information about the first session.

The determining module is configured to determine a second session management function entity different from the first session management function entity, where the first session management function entity is a session management function entity that is corresponding to the information about the first session and that is determined by querying the correspondence saved on the apparatus.

The transceiver module is further configured to send a session management request to the second session management function entity.

In a possible implementation, the information about the first session includes an identifier of the first session; or the information about the first session includes an identifier of the UE and an identifier of the first session.

In another possible implementation, the session establishment request message further carries an identifier of a second session to be created by the UE.

In another possible implementation, the transceiver module is further configured to send a session re-establishment indication to the UE, to instruct the UE to establish the second session.

The apparatus may be a mobility management function entity in a communications network, or an AMF, or another entity in a communications network. All related content of the steps in the foregoing method embodiments may be cited in function descriptions of corresponding function modules, and details are not described herein again.

Figure 11:
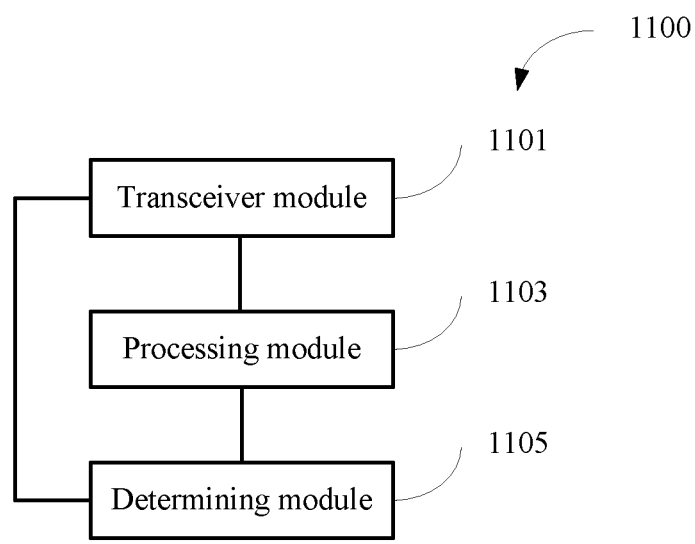
FIG. 11 is a schematic structural diagram of another session management function entity selection apparatus according to an embodiment of the present application.

FIG. 11 is a possible schematic structural diagram of a session management function entity selection apparatus in the foregoing embodiments. The apparatus 1100 includes a transceiver module 1101, a processing module 1103, and a determining module 1105.

The transceiver module is configured to receive a location change notification message, send a session management message to a first session management function entity, receive a session management function entity reselection result and information about a first session of user equipment UE from the first session management function entity, where the session management function entity reselection result includes information about a second session management function entity.

The processing module is configured to save a correspondence between the second session management function entity and the information about the first session.

The transceiver module is further configured to receive a session establishment request message, where the session establishment request message carries the information about the first session.

The determining module is configured to determine, by querying the correspondence, the second session management function entity corresponding to the information about the first session.

The transceiver module is further configured to send a session management request to the second session management function entity.

In a possible implementation, the information about the first session includes an identifier of the first session; or the information about the first session includes an identifier of the UE and an identifier of the first session.

In another possible implementation, the session establishment request message further carries an identifier of a second session to be created by the UE.

In another possible implementation, the transceiver module is further configured to send a session re-establishment indication to the UE, to instruct the UE to establish the second session.

Figure 12:
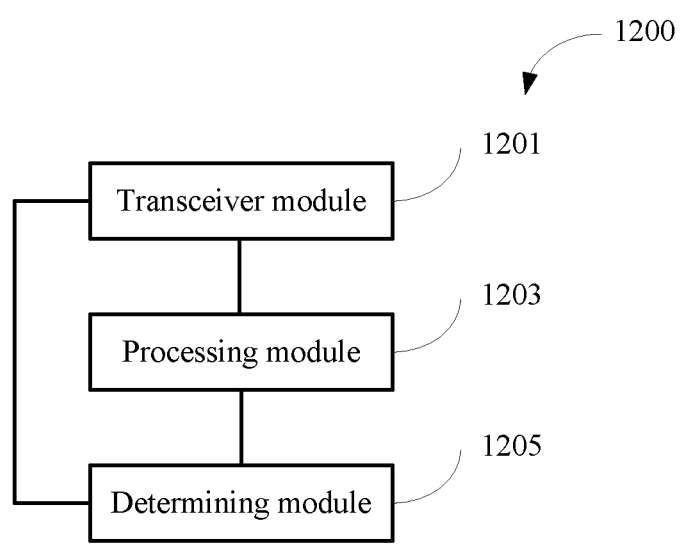
FIG. 12 is a schematic structural diagram of another session management function entity selection apparatus according to an embodiment of the present application.

FIG. 12 is a possible schematic structural diagram of a session management function entity selection apparatus in the foregoing embodiments. The apparatus 1200 includes a transceiver module 1201, a processing module 1203, and a determining module 1205.

The transceiver module is configured to receive a session management function entity selection result and information about a first session of user equipment UE from a first session management function entity, where the session management function entity selection result includes information about the first session management function entity. Alternatively, the transceiver module is configured to receive indication information and information about a first session of user equipment UE from a first session management function entity.

The processing module is configured to save a correspondence between the first session management function entity and the information about the first session. The transceiver module is further configured to receive a session establishment request message, where the session establishment request message carries the information about the first session. The determining module is configured to determine, by querying the correspondence, the first session management function entity corresponding to the information about the first session. The transceiver module is further configured to send a session management request to the first session management function entity.

In a possible implementation, the information about the first session includes an identifier of the first session; or the information about the first session includes an identifier of the UE and an identifier of the first session.

In another possible implementation, the session establishment request message further carries an identifier of a second session to be created by the UE.

In another possible implementation, the transceiver module is further configured to send a session re-establishment indication to the UE, to instruct the UE to establish the second session. The apparatus may be a mobility management function entity in a communications network, or an AMF, or another entity in a communications network. All related content of the steps in the foregoing method embodiments may be cited in function descriptions of corresponding function modules, and details are not described herein again.

In this embodiment, the session management function entity selection apparatus is presented by obtaining each function module through division based on each corresponding function, or the session management function entity selection apparatus is presented by obtaining each function module through division in an integrated manner. The "module" herein may be an application-specific integrated circuit (ASIC), a circuit, a processor that executes one or more software or firmware programs and a memory, an integrated logic circuit, and/or another device that can provide the foregoing function. In a simple embodiment, it may be appreciated by persons skilled in the art that the session management function entity selection apparatuses 1000 and 1100 may use the form shown in FIG. 3. For example, the transceiver module 1001, the processing module 1003, and the determining module 1005 in FIG. 10 may be implemented by using the processor 31 (and/or the processor 38) and the memory 33 in FIG. 3. For example, the transceiver module 1001, the processing module 1003, and the determining module 1005 may be performed by the processor 31 (and/or the processor 38) invoking the application program code stored in the memory 33. This is not limited in this embodiment of the present application. The transceiver module 1101, the processing module 1103, and the determining module 1105 in FIG. 11 may be implemented by using the processor 31 (and/or the processor 38) and the memory 33 in FIG. 3. For example, the transceiver module 1101, the processing module 1103, and the determining module 1105 may be performed by the processor 31 (and/or the processor 38) invoking the application program code stored in the memory 33. This is not limited in this embodiment of the present application. The transceiver module 1201, the processing module 1203, and the determining module 1205 in FIG. 12 may be implemented by using the processor 31 (and/or the processor 38) and the memory 33 in FIG. 3. For example, the transceiver module 1201, the processing module 1203, and the determining module 1205 may be performed by the processor 31 (and/or the processor 38) invoking the application program code stored in the memory 33. This is not limited in this embodiment of the present application.

An embodiment of the present application further provides a computer storage medium configured to store a computer software instruction used by the session management function entity selection apparatus shown in FIG. 4 or FIG. 5, and the computer storage medium includes a program designed to perform the foregoing method embodiments.

An embodiment of the present application further provides another computer storage medium configured to store a computer software instruction used by the session management function entity selection apparatus shown in FIG. 6 or FIG. 7, and the computer storage medium includes a program designed to perform the foregoing method embodiments.

An embodiment of the present application further provides another computer storage medium configured to store a computer software instruction used by the session management function entity selection apparatus shown in FIG. 8 or FIG. 9, and the computer storage medium includes a program designed to perform the foregoing method embodiments.

An embodiment of the present application further provides a computer program product configured to store a computer software instruction used by a mobility management function entity or an AMF, and the computer program product includes a program designed to perform the foregoing method embodiments.

In the specification, claims, and accompanying drawings in the embodiments of this application, the terms "first", "second", "third", and the like are not used to indicate a specific order or sequence. It should be understood that the data termed in such a way are interchangeable in proper circumstances so that the embodiments described herein can be implemented in orders other than the order illustrated or described herein. Moreover, the term "include" or "contain" and any other variants mean to cover the non-exclusive solution, for example, a process, method, system, product, or device that includes a list of steps or units is not necessarily limited to those expressly listed steps or units, but may include other steps or units not expressly listed or inherent to such a process, method, system, product, or device.

Although this application is described with reference to the embodiments, in a process of implementing this application that claims protection, persons skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. The fact that some measures are recited in mutually different dependent claims does not indicate that a combination of these measures cannot bring better effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A session management function entity selection method comprising:
   sending, to a mobility management function entity by a first session management function entity serving a first session of a user equipment (UE), a first identifier of the first session and a reselection indication associated with the first identifier, wherein the reselection indication indicates reselecting a different session management function entity different from the first session management function entity;
   receiving, by the mobility management function entity, the reselection indication and the first identifier;
   receiving, by the mobility management function entity from the UE, a session establishment request message for establishing a second session, wherein the session establishment request message comprises the first identifier; and
   selecting, by the mobility management function entity according to the reselection indication, a second session management function entity different from the first session management function entity for the second session.

2. The method of claim 1, further comprising releasing, by the first session management function entity, the first session.

3. The method of claim 1, wherein the session establishment request message further comprises an identifier of the second session.

4. The method of claim 1, further comprising sending, by the first session management function entity, a session re-establishment indication to the UE for establishing the second session.

5. The method of claim 1, further comprising sending, by the first session management function entity, a session release timer to the UE.

6. A system for selecting a session management function entity, wherein the system comprises:
   a first session management function entity configured to:
      serve a first session of a user equipment (UE); and
      send a first identifier of the first session and a reselection indication associated with the first identifier, wherein the reselection indication indicates reselecting a different session management function entity different from the first session management function entity; and
   a mobility management function entity configured to:
      receive, from the first session management function entity, the reselection indication and the first identifier;
      receive, from the UE, a session establishment request message for establishing a second session, wherein the session establishment request message comprises the first identifier; and
      select according to the reselection indication, a second session management function entity different from the first session management function entity for the second session.

7. The system of claim 6, wherein the first session management function entity is further configured to release the first session.

8. The system of claim 6, wherein the session establishment request message further comprises an identifier of the second session.

9. The system of claim 6, wherein the first session management function entity is further configured to send a session re-establishment indication to the UE for establishing the second session.

10. The system of claim 6, wherein the first session management function entity is further configured to send a session release timer to the UE.

11. An apparatus, comprising:
   a processor; and
   a memory configured to store instructions which, when executed by the processor, cause the apparatus to:
      receive, from a first session management function entity serving a first session of a user equipment (UE), a first identifier of the first session and a reselection indication associated with the first identifier, wherein the reselection indication indicates reselecting a different session management function entity different from the first session management function entity;
      receive, from the UE, a session establishment request message for establishing a second session, wherein the session establishment request message comprises the first identifier; and select according to the reselection indication, a second session management function entity different from the first session management function entity for the second session.

12. The apparatus of claim 11, wherein the instructions further cause the apparatus to release the first session.

13. The apparatus of claim 11, wherein the session establishment request message further comprises an identifier of the second session.

14. The apparatus of claim 11, wherein the instructions further cause the apparatus to send a session re-establishment indication to the UE for establishing the second session.

15. The apparatus of claim 11, wherein the instructions further cause the apparatus to send a session release timer to the UE.

16. A terminal apparatus, comprising
a processor; and
a memory configured to store instructions which, when executed by the processor, cause the terminal apparatus to:
   send a first session establishment request to a mobility management function entity for establishing a first session served by a first session management function entity;
   receive a session re-establishment indication from the first session management function entity; and
   send, in response to the session re-establishment indication, a second session establishment request to the mobility management function entity for establishing a second session, wherein the second session establishment request comprises a first identifier of the first session for selecting a second session management function entity different from the first session management function entity for the second session.

17. The terminal apparatus of claim 16, wherein the instructions further cause the terminal apparatus to release the first session.

18. The terminal apparatus of claim 16, wherein the second session establishment request further comprises an identifier of the second session.

19. The terminal apparatus of claim 16, wherein the second session establishment request further comprises data network name (DNN) information.

20. The terminal apparatus of claim 16, wherein the instructions further cause the terminal apparatus to receive a session release timer.

\* \* \* \* \*